(12) United States Patent
Lomerson, Sr. et al.

(10) Patent No.: US 7,827,788 B1
(45) Date of Patent: Nov. 9, 2010

(54) WATER POWER GENERATOR

(76) Inventors: Robert B. Lomerson, Sr., 9962 Boat Club Rd., Fort Worth, TX (US) 76179-4004; Robert B. Lomerson, Jr., 3420 Spring Valley Dr., Bedford, TX (US) 76021

( * ) Notice: Subject to any disclaimer, the term of this patent is extended or adjusted under 35 U.S.C. 154(b) by 257 days.

(21) Appl. No.: 12/200,143

(22) Filed: Aug. 28, 2008

Related U.S. Application Data

(63) Continuation-in-part of application No. 11/715,003, filed on Mar. 7, 2007, now Pat. No. 7,432,612, which is a continuation-in-part of application No. 11/448,503, filed on Jun. 7, 2006, now Pat. No. 7,199,483, which is a continuation-in-part of application No. 11/064,579, filed on Feb. 24, 2005, now Pat. No. 7,075,190.

(51) Int. Cl.
*F03B 13/18* (2006.01)
*F03B 17/02* (2006.01)
*F03B 13/10* (2006.01)
*F03B 13/12* (2006.01)
*H02P 9/04* (2006.01)

(52) U.S. Cl. .............................. 60/497; 60/495; 60/498; 290/42; 290/53

(58) Field of Classification Search ........... 60/495–507; 290/53, 54
See application file for complete search history.

(56) References Cited

U.S. PATENT DOCUMENTS

| 163,451 | A | 5/1875 | Buckner |
| 559,969 | A | 5/1896 | Delmonte |
| 596,124 | A | 12/1897 | Pyle |
| 639,734 | A | 12/1899 | Johnson |
| 884,080 | A | 4/1908 | Fallis |
| 896,572 | A | 8/1908 | Pepper |
| 974,282 | A | 11/1910 | Brum |
| 987,685 | A | 3/1911 | Atkinson |
| 1,004,332 | A | 9/1911 | Allen |
| 1,035,049 | A | 8/1912 | Read |
| 1,048,389 | A | 12/1912 | Braunsdorf |

(Continued)

FOREIGN PATENT DOCUMENTS

GB       2039330 A    8/1980

(Continued)

*Primary Examiner*—Thomas E Denion
*Assistant Examiner*—Christopher Jetton
(74) *Attorney, Agent, or Firm*—Geoffrey A. Mantooth

(57) ABSTRACT

A tidal power generator has a floating vessel hull that is subject to rising and falling water levels so that the hull moves vertically up and down. Linear-to-rotary converters are coupled between the vessel hull and a fixed object. The converters allow the hull to move vertically while constraining the horizontal movement of the hull. The converters convert the vertical movement of the hull into rotary movement, which is then used to drive an electrical generator. A harborage is provided to protect the hull and the converters and to regulate the water level for the vessel hull as well as become a fixed object relative to the vessel from which a change in relative position causes power to be developed. If the hull is subject to tidal variations, vertical movement of the hull can be desynchronized from the tidal variations so as to store energy during slack tides.

19 Claims, 22 Drawing Sheets

U.S. PATENT DOCUMENTS

| | | |
|---|---|---|
| 1,061,061 A | 5/1913 | Frame |
| 1,066,396 A | 7/1913 | Frame |
| 1,083,794 A | 1/1914 | Braunsdorf |
| 1,089,120 A | 3/1914 | Erickson |
| 1,105,249 A | 7/1914 | Bustos |
| 1,177,053 A | 3/1916 | Priestley |
| 1,276,112 A | 8/1918 | Reed |
| 1,376,140 A | 4/1921 | Ervin |
| 1,403,702 A | 1/1922 | Melvin |
| 1,471,222 A | 10/1923 | Taylor |
| 1,482,713 A | 2/1924 | Stein |
| 1,693,125 A | 11/1928 | Van Epps |
| 1,799,848 A | 4/1931 | Hansen |
| 1,816,044 A | 7/1931 | Gallagher |
| 1,818,066 A | 8/1931 | Jouy |
| 1,864,499 A | 6/1932 | Grigsby |
| 2,749,085 A | 6/1956 | Searcy |
| 2,855,851 A | 10/1958 | Shumen |
| 3,664,125 A | 5/1972 | Strange |
| 3,668,412 A * | 6/1972 | Vrana et al. .................. 290/53 |
| 3,928,771 A | 12/1975 | Straumsnes |
| 3,959,663 A | 5/1976 | Rusby |
| 4,034,565 A | 7/1977 | McVeigh |
| 4,184,336 A | 1/1980 | Lamberti |
| 4,196,591 A | 4/1980 | Wallace |
| 4,208,878 A | 6/1980 | Rainey |
| 4,218,192 A | 8/1980 | West |
| 4,241,283 A | 12/1980 | Storer, Sr. |
| 4,305,003 A | 12/1981 | Basurto |
| 4,434,375 A | 2/1984 | Taylor |
| 4,443,707 A | 4/1984 | Scieri |
| 4,455,824 A | 6/1984 | Dabringhaus |
| 4,464,080 A | 8/1984 | Gorlov |
| 4,475,334 A | 10/1984 | Kuwabara |
| 4,476,396 A | 10/1984 | Calvert, Jr. |
| 4,540,313 A | 9/1985 | Broome |
| 4,594,853 A | 6/1986 | Raichlen |
| 4,603,551 A | 8/1986 | Wood |
| 4,627,240 A | 12/1986 | Holmes |
| 4,674,279 A | 6/1987 | Ali et al. |
| 4,698,969 A | 10/1987 | Raichlen |
| 5,186,822 A | 2/1993 | Tzong et al. |
| 5,222,833 A * | 6/1993 | Gorlov ....................... 405/76 |
| 5,929,531 A | 7/1999 | Lagno |
| 6,000,880 A | 12/1999 | Halus |
| 6,275,570 B1 | 8/2001 | Homan |
| 6,800,954 B1 | 10/2004 | Meano |
| 6,803,670 B2 * | 10/2004 | Peloquin ..................... 290/53 |
| 6,812,588 B1 | 11/2004 | Zadig |
| 6,863,806 B2 | 3/2005 | Stark et al. |
| 7,078,827 B2 | 7/2006 | Brewington |
| 7,084,521 B1 | 8/2006 | Martin |

FOREIGN PATENT DOCUMENTS

| | | |
|---|---|---|
| GB | 2394514 A | 4/2004 |
| GB | 2407345 A | 4/2005 |
| JP | 62228672 A | 10/1987 |
| JP | 10274145 A | 10/1998 |
| WO | WO 02092919 A1 | 11/2002 |

\* cited by examiner

WATER POWER GENERATOR

This application is a continuation-in-part application of application Ser. No. 11/715,003, filed Mar. 7, 2007, now U.S. Pat. No. 7,432,612 which application was a continuation-in-part application of application Ser. No. 11/448,503, filed Jun. 7, 2006, now U.S. Pat. No. 7,199,483 which was a continuation-in-part patent application of application Ser. No. 11/064,579, filed Feb. 24, 2005, now U.S. Pat. No. 7,075,190.

FIELD OF THE INVENTION

The present invention relates to extracting energy from tides on water bodies and from water head.

BACKGROUND OF THE INVENTION

Most of the electricity generated in the United States requires hydrocarbon-based fuel sources such as coal, oil or natural gas. The burning of such fuels produces harmful emissions that are both difficult and expensive to either contain, or remove, from the exhaust gasses. Also, the transport of these fuels from point of origin, to point of processing (such as refining crude oil), to point of use not only requires the expenditure of additional energy, but is inefficient, costly, potentially hazardous and creates further harmful emissions. In addition, most sources of liquid hydrocarbon-based fuels used in the United States are located outside of the United States. The political environments of many producing areas, such as the Middle East, Venezuela, Russia and Nigeria have been unstable in recent history.

Nuclear power plants pose an alternative generating source to hydrocarbon fuels. However, nuclear power plants are expensive to build and pose security problems. Also, the disposal and storage of spent nuclear fuel is an expensive and a highly contentious problem. Public perception of nuclear power plants is largely negative.

Solar panels are still another alternative. At present, solar panels are high in cost, very low in efficiency and are unusable at night and on cloudy or stormy days. Wind power, while available, is also dependent on the weather as well as being inefficient and relatively expensive.

In contrast to solar and wind, the tides are highly regular, cycling once or twice each twenty-four hour period. Although the height of tides vary due to factors such as coastline geography, the lunar cycle, and to a lesser degree, the direction and velocity of the wind, tides are remarkably constant and continuously changing. In some areas of the world, the water level range may be as much as forty-four feet between high and low tide.

In the prior art, tides have been harnessed by opening and closing flood gates to impound a head of water. The impounded water drives turbines. Such schemes have been planned, if not actually used, in Passamaquoddy Bay between Maine and New Brunswick, Canada. The continuous opening and closing of the flood gates creates problems. Also, the efficiency is somewhat low because only part of the tidal rise and fall can be used. Marine life is adversely impacted as well.

SUMMARY OF THE INVENTION

The present invention provides a power generator that comprises a harborage with a vessel hull therein. A supply reservoir larger than the harborage is provided. The supply reservoir has a valved inlet subject to fluctuating water levels of a water body. The reservoir communicates with the harborage through a reservoir valve. A drainage area is provided which is larger than the harborage. The drainage area has a valved outlet subject to fluctuating water levels of the water body. The drainage area communicates with the harborage through a drainage valve. The vessel hull is capable of rising and falling in the harborage as the level of water in the harborage changes independently of the water level of the water body due to the reservoir supplying water to the harborage through the reservoir valve and the drainage area draining water from the harborage by way of the drainage valve. A linear-to-rotary converter is provided, with at least one part being coupled between the hull and a fixed object. The converter converts the vertical movement of the hull into rotational movement.

In accordance with one aspect of the present invention the water body is subject to tidal activity.

In accordance with another aspect of the present invention the water body is subject to flooding.

In accordance with another aspect of the present invention the harborage communicates with the water body through a harborage valve.

In accordance with still another aspect of the present invention the valved inlet allows the water level in the harborage to rise rapidly.

In accordance with another aspect of the present invention the valved outlet allows the water level in the harborage to fall rapidly.

In accordance with another aspect of the present invention the valved inlet, the valved outlet, or both the valved inlet and the valved outlet, comprise multiple vanes.

In accordance with still another aspect of the present invention the supply reservoir is a first supply reservoir, further comprising a second supply reservoir. The second supply reservoir communicates with the harborage through a second reservoir valve, the second supply reservoir serves as a peaking reservoir.

In accordance with still another aspect of the present invention the drainage area is a first drainage area, further comprising a second drainage area, the second drainage area communicating with the harborage through a second drainage valve, the second drainage area serving as a peaking drainage area.

In accordance with another aspect of the present invention a water lift is provided, which water lift lifts water from a first elevation in the harborage to a higher second elevation outside of the harborage.

In accordance with still another aspect of the present invention the first elevation is located below the low tide of the water body.

In accordance with still another aspect of the present invention the water lift comprises a bottom with an inclined side wall that extends radially out from the bottom. The water lift forms an interior. The water lift rotates. The valved outlet communicates with the interior.

The present invention also provides an apparatus for raising and lowering a vessel hull. The apparatus comprises a harborage, with the vessel hull located therein. The vessel hull is capable of moving up and down in the harborage. A water supply communicates with the harborage through a supply valve. The water supply provides water to the harborage to a high level. A water lift comprises a bottom with an inclined side wall that extends up and radially out from the bottom. The water lift forms an interior. The water lift rotates. A drainage area is also provided. A drain outlet allows communication between the harborage and the water lift interior, wherein water in the interior of the rotating lift moves up the side wall to a higher elevation than the bottom and exits the lift into the drainage area.

In accordance with one aspect of the present invention the water supply and the drainage area are subject to tidal activity.

In accordance with another aspect of the present invention the tidal activity comprises a high tide level and a low tide level. The water lift lifts water in the harborage that is below the low tide level to a level that is at least as high as the low tide level.

In accordance with still another aspect of the present invention water jets are directed at push surfaces on the water lift for rotating the water lift. The water in the water jets drains into the drainage area.

In accordance with still another aspect of the present invention a linear-to-rotary converter is provided with at least one part being coupled between the hull and a fixed object. The converter converts the vertical movement of the hull into a rotational movement.

BRIEF DESCRIPTION OF THE DRAWINGS

FIG. 15 shows the vessel hull rising.

FIG. 16 shows the vessel hull at maximum vertical elevation with the vessel hull taking on water.

FIG. 17 shows the vessel hull at minimum vertical elevation with the water being discharged therefrom.

FIG. 28A shows the valve arrangement in a closed configuration. FIG. 28B shows the valve arrangement in an open configuration and is taken through lines XXVIIIB-XXVIIIB of FIG. 27.

DESCRIPTION OF THE PREFERRED EMBODIMENT

The present invention provides a way to extract energy from the rise and fall of the tides as well as water head. A vessel hull is provided in a protective harborage enclosure. Water from the tides is admitted into the harborage so as to raise the vessel hull and released so as to lower the vessel hull. Mechanical converters are attached between the movable hull and a fixed object, such as the harborage itself; the converters convert the vertical movement of the hull into mechanical energy such as pressurized fluid, which is used to power various devices such as an electrical generator. The electricity can be transmitted over conventional power lines to users.

Alternatively, a harborage or lock is provided in a situation where water head can be found, such as by a dam in a river. The vessel hull rises and falls within the harborage; that motion is converted into mechanical energy, such as pressurized fluid, which can be used for a variety of applications, such as rotating a turbine to produce electrical power.

Figure 1:
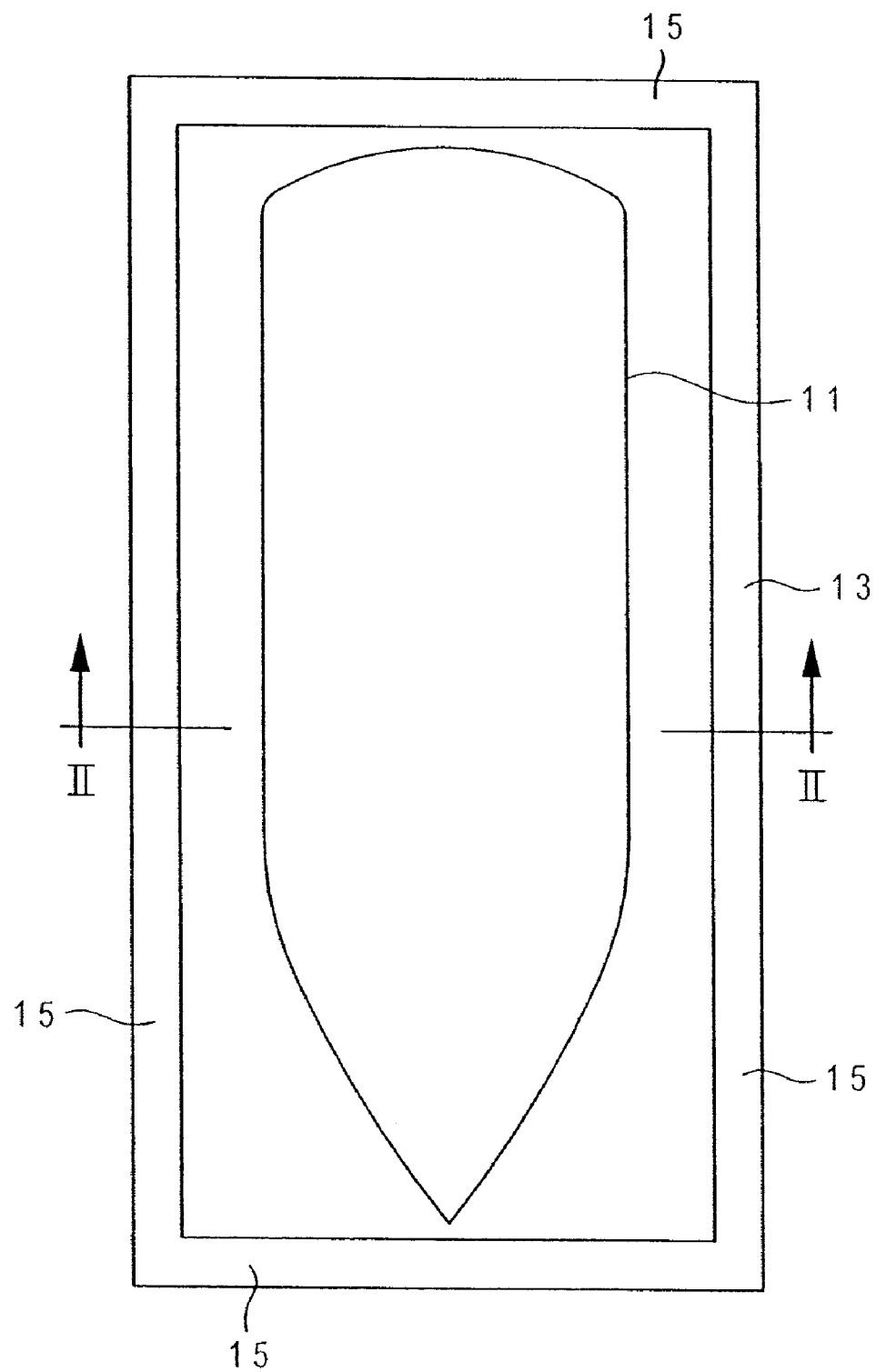
FIG. 1 is a plan view of a hull and harborage enclosure arrangement as used with the present invention, in accordance with a preferred embodiment.
Figure 2:
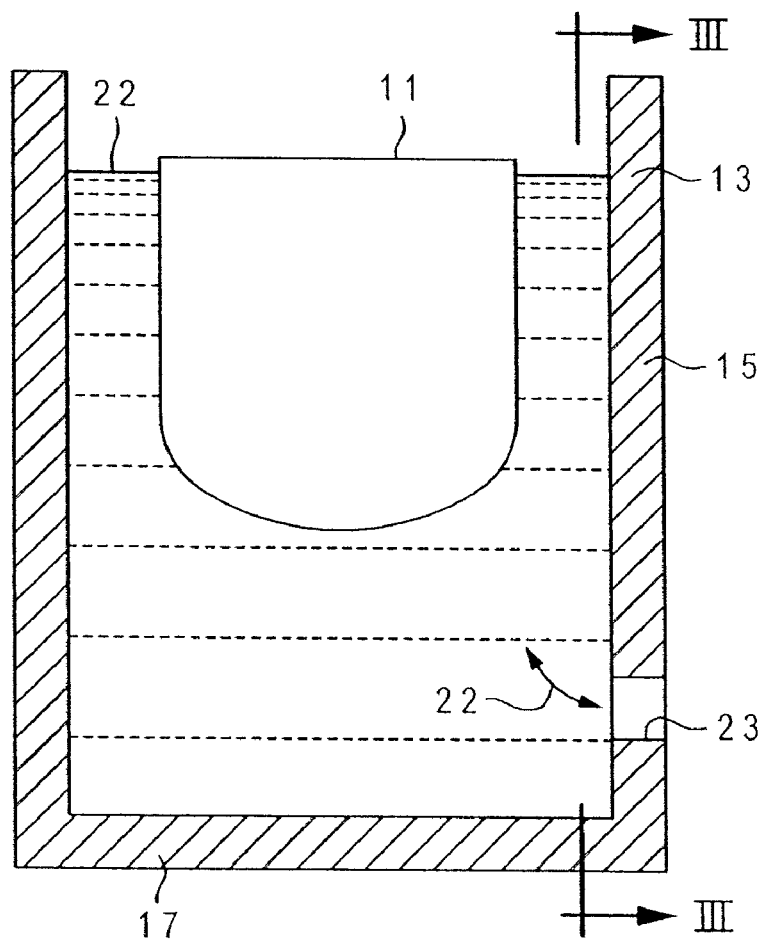
FIG. 2 is a cross-sectional view, taken through lines II-II of FIG. 1.

The vessel hull can be an ocean-going ship, an inland (fresh water) ship, a barge, etc. The vessel hull 11 can be a ship hull (see FIGS. 1 and 2). After a ship has served a useful life, whether commercially or militarily, it is mothballed or scrapped. Using a scrapped ship hull in this invention reduces costs and allows the serviceable life of the hull to be extended.

The hull is stripped of all non-essential equipment such as engines. In addition, the hull is sealed and made water tight. For example, the propeller shaft can be removed and the shaft opening sealed. Components subject to bimetallic degradation are removed. The deck can also be sealed in order to minimize the amount of freeboard. Minimizing the amount of freeboard allows for increased hull displacement, which in turn allows for an increase in power generation.

The vessel hull need not be a used hull, but could be constructed for this particular purpose. For example, because the hull need only move up and down and does not need to move horizontally, the hull can be a large rectangular box without any drag-minimizing shapes or configurations. Such a hull can be designed to maximize buoyancy. The hull can be made of metal, wood, composites (such as fiberglass) or other materials. A deck or a top is provided on the hull in order to keep rain and water from entering the hull. The weight of the hull 11 can be adjusted with ballast and equipment. Most if not all of the electrical generation equipment can be located in the hull 11.

The side walls of the hull 11 can be strengthened if need be. To this end, steel plates can be welded onto the inside or outside of a hull.

The harborage 13 receives the vessel hull 11 and allows the vessel hull to move vertically up and down with varying water levels. In some installations, the harborage protects the vessel hull and the other equipment (such as the linear-to-rotary converters discussed below). In some installations, the harborage serves to regulate the water level and thus the vertical movement of the vessel hull.

Referring to FIGS. 1-4, the harborage 13 surrounds the sides of the hull 11 so as to protect the hull from wind and wave action. This is particularly desirable where the harborage is located in bays or open water and is subject to storms, ice or tsunamis. In most locations, the harborage completely surrounds the hull. However, in some locations, the harborage need not surround the hull but need only be between the rough water and the hull, much like a break water. The harborage 13 has side walls 15. The side walls can be set into the bottom of a water body, such as a bay or channel, or it can be attached to a bottom wall 17 which bears on the bottom of a water body. Underneath the bottom wall 17 is some foundational structure. One of the walls forms a door 19 (see FIG. 4) or doors that can be opened and closed. This allows the hull to be floated through the open doors into the harborage, with the doors closing. Alternatively, the harborage can be left open with one wall missing, until the hull is located therein. After the hull is located inside of the harborage, then the wall can be attached to close off the access opening. A roof 21 or top wall can be provided so as to fully enclose the hull and allow the interior to be sheltered from the weather.

The harborage 13 can be of metal or concrete or even of earth walls. For example, the harborage could be a dry dock that is to be mothballed or a caisson that is floated to the desired location and then sunk. The harborage could also be of the cofferdam type which has vertical steel panels inserted into the bottom of a water body.

The harborage 13 is not water tight so as to allow water 22 to flow in and out. One or more ports 23, or openings, are provided in one or more of the side walls 15. The ports 23 are located below the lowest level of water outside of the harborage, such as below the lowest tide.

Figure 4A:
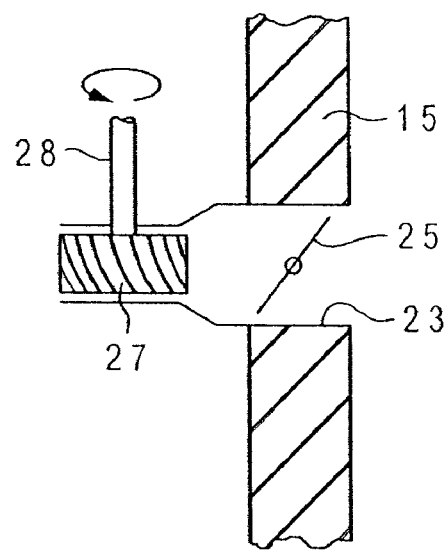
FIG. 4A is a cross-sectional view of a port in the harborage enclosure.
Figure 3:
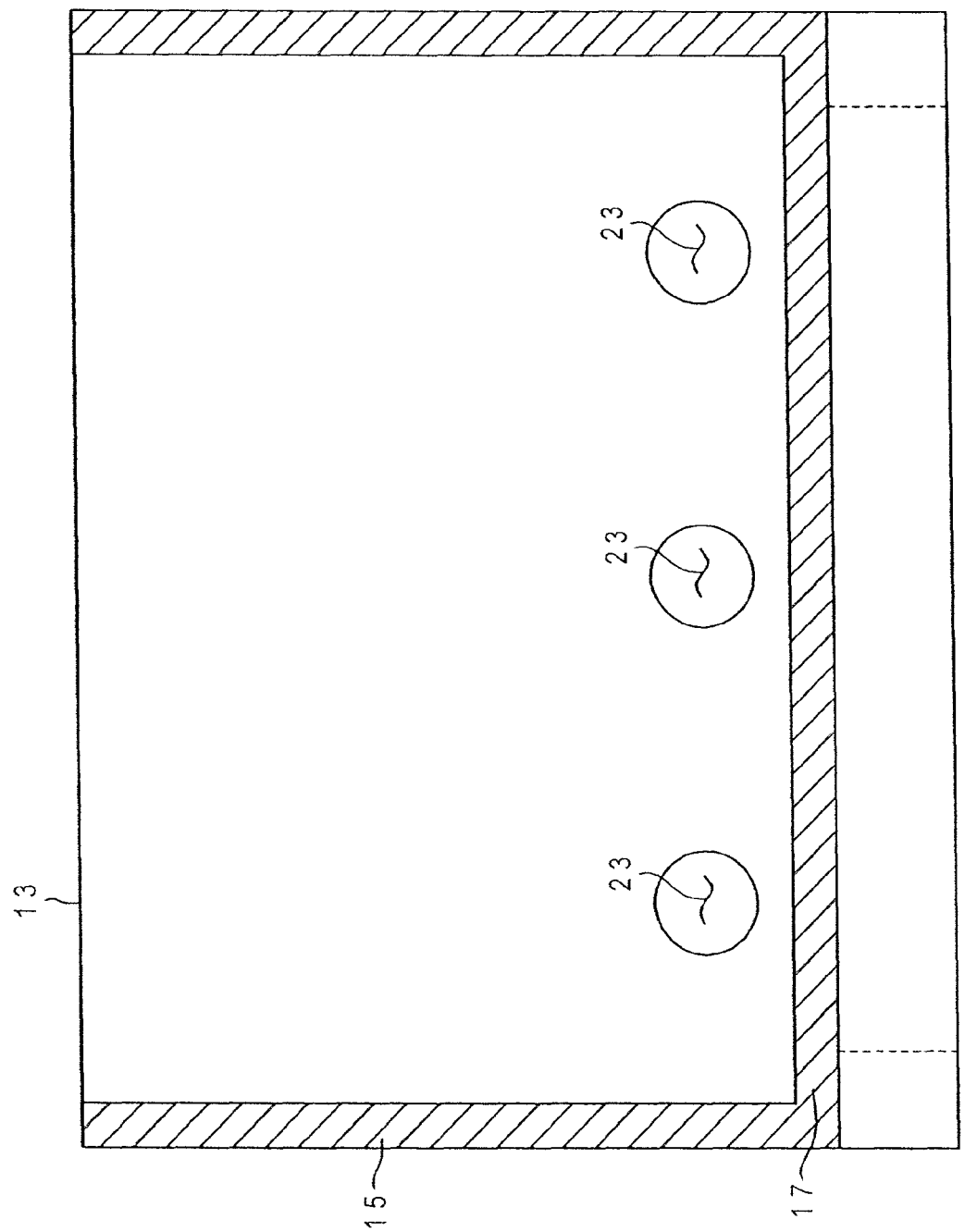
FIG. 3 is a cross-sectional view of a side wall of the harborage enclosure taken through lines of FIG. 2.

In the preferred embodiment, the ports 23 are equipped with valves 25 (see FIG. 4A). When the water level is lowered and the valves 25 are closed, the harborage can be used to maintain or repair the vessel hull, much like a dry dock.

The ports 23 can also be equipped with impellers or turbines 27. The valves 25 are selectively opened and closed to regulate the amount of water flowing through the ports 23. The turbines 27 rotate when water moves through the ports. The turbines are connected to electric generators. The turbines can be directly connected to generators, such as by shafts 28 and gears. Alternatively, the turbines could drive hydraulic motors which in turn drive the electrical generators.

The harborage 13 is located so as to be subjected to different water levels. For example, the harborage could be located in a water body such as a harbor or bay. Preferably, the harborage is located in an area with a large tidal swing, such as off the coasts of New England, or of France, or in the Bay of Fundy, the Bay of Bengal or the Arabian Sea along India. The harborage could also be located in open water, much like a platform for oil and gas wells. The Gulf of Mexico, off the Louisiana coast, is heavily populated with such platforms. Alternatively, the harborage could be set into land, with a water channel that subjects the hull inside of the harborage to tidal activity or variable water levels. Such a harborage would be surrounded by land on three sides with the remaining side having one or more openings to the water. Alternatively, the harborage could access a water body with tidal activity via a channel, such as a river, canal or large ducts.

Figure 4:
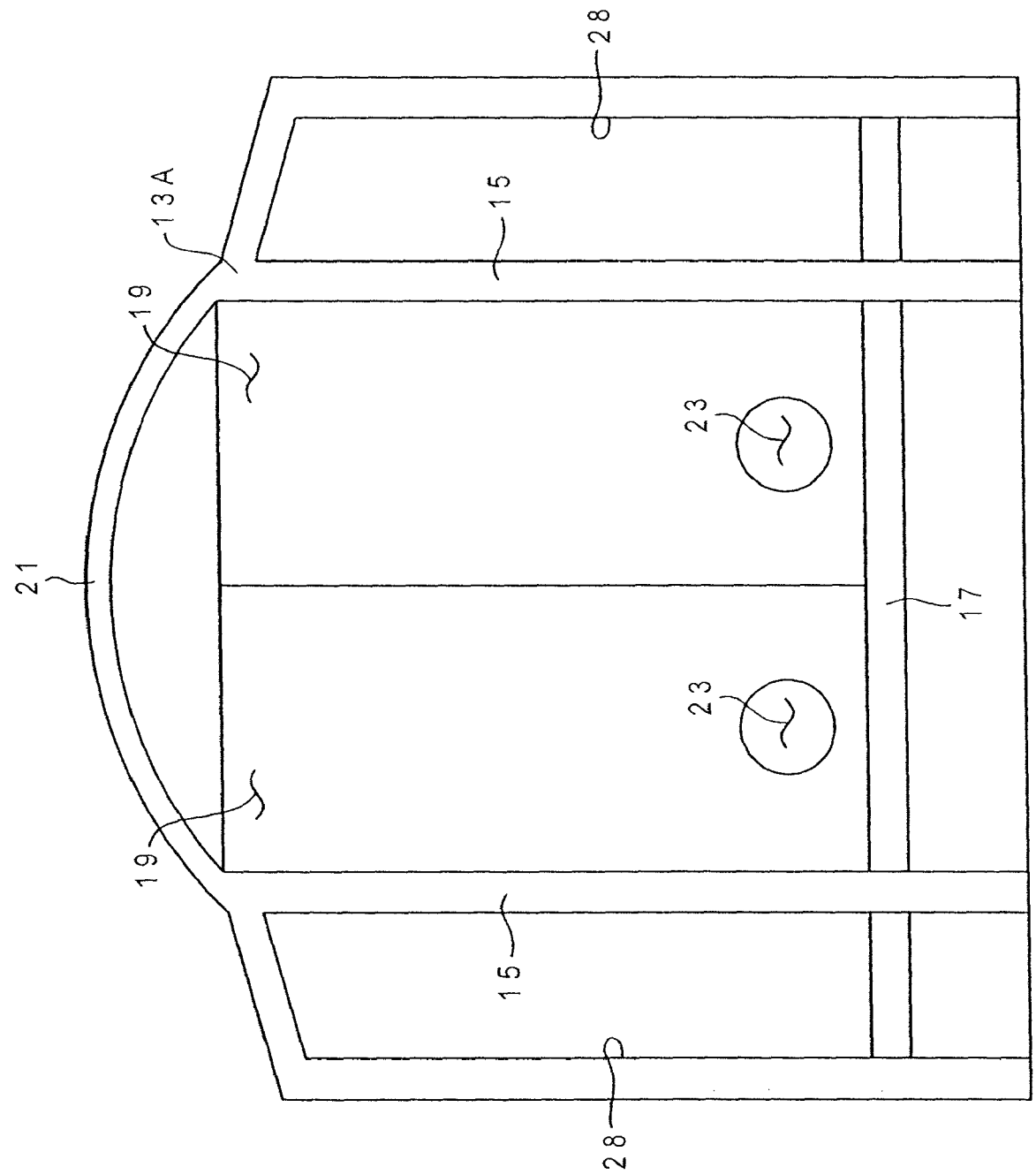
FIG. 4 is an end view of the harborage enclosure, in accordance with another embodiment.

FIG. 4 shows a harborage 13A in accordance with another embodiment. The harborage 13A blocks a passage, such as in a break water, or a barrier. Ducts 28 are covered to protect the water on the sides from freezing in cold weather. Alternatively, the ducts could serve as canals 28 on one or both sides allow water to flow past the harborage. In this embodiment, the harborage can act as a lock.

The harborage 13 is deep enough and large enough so that the hull is always floating, even with low tide or low water levels. If the harborage is not deep enough, and there is no bottom wall, the bottom can be dredged out or excavated to increase the depth beneath the hull. The side walls of the harborage are high enough to offer protection from wind and waves, particularly in stormy weather. To minimize damage, the hull should be shielded from exposure to high wind and waves.

As the tides change, water moves in and out of the harborage. In the preferred embodiment, the water ingresses and egresses the harborage through the ports 23. The doors 19 could be opened and closed to allow water to move in and out of the harborage. When the tide is coming in, water enters the harborage through the ports 23, spins the turbines 27, and lifts the hull 11. When the tide is leaving, the water exits the harborage through the ports, spinning the turbines 27 and allowing the hull to lower. Thus, the hull moves vertically up and down inside of the harborage.

This motion of the hull 11 is captured by linear-to-rotary converters between the hull and a fixed object, such as the harborage, the water body bottom, or in the case of an harborage adjacent to land, then the land itself. The hull movement can be captured by a number of types of devices. One such converter is a hydraulic cylinder and piston. Another type of converter uses levers and gears, while another uses cables and pulleys, while still another uses a rack and pinion gear.

Figure 5:
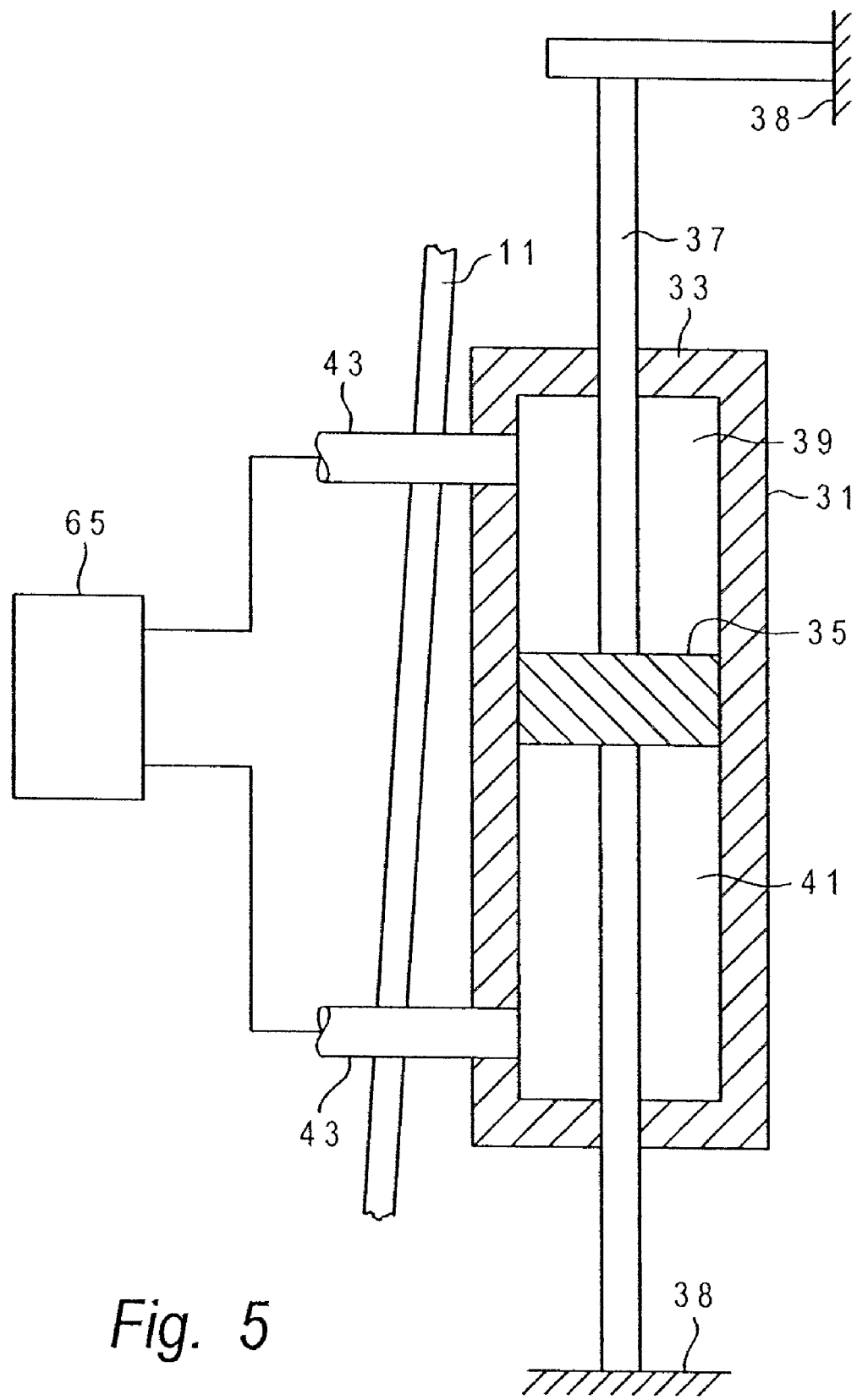
FIG. 5 illustrates one type of linear-to-rotary converter, namely a piston-cylinder arrangement, between the vessel hull and a fixed object.

Referring to FIG. 5, there is shown a double acting piston and cylinder 31. In the preferred embodiment, the cylinder 33 is coupled to the vessel hull 11, while the piston 35, mounted on a rod 37, is coupled to a fixed object 38, such as the harborage 13. Thus, the cylinder 33 moves with the hull 11, while the piston 35 is fixed. The piston 35 divides the cylinder 33 into an upper chamber 39 and a lower chamber 41. Hydraulic lines 43 extend from each chamber through the vessel hull to a turbine 65 located in the vessel or on shore. As the vessel 11 rises, with an incoming tide or rising water level, the cylinder 33 moves up. The piston 35 pressurizes the hydraulic fluid in the lower chamber 41 and provides a partial vacuum to the hydraulic fluid in the upper chamber 39. Conversely, as the vessel falls, with a receding tide, the piston pressurizes the hydraulic fluid in the upper chamber 39 and provides a partial vacuum to the hydraulic fluid in the lower chamber 41. The hydraulic fluid can be a liquid or gas or a combination of both. The hydraulic fluid is preferably water, or even more preferably, a polymer or oil based liquid. A long chain polymer liquid is less likely to leak around the piston.

The piston and cylinder can be made of ceramic. Ceramic is strong and can withstand large forces that are applied to the piston and cylinder. Ceramic can be finely machined to provide for tight tolerances between the piston and the cylinder. With tight tolerances, such as on the order of microns of clearance between the piston and the cylinder, no seal between the piston and the cylinder is required. A hydraulic fluid with long chain polymers will not leak past the cylinder.

As an alternative, the piston 35 could be coupled to the vessel wall and the cylinder 33 fixed stationary.

Figure 6:
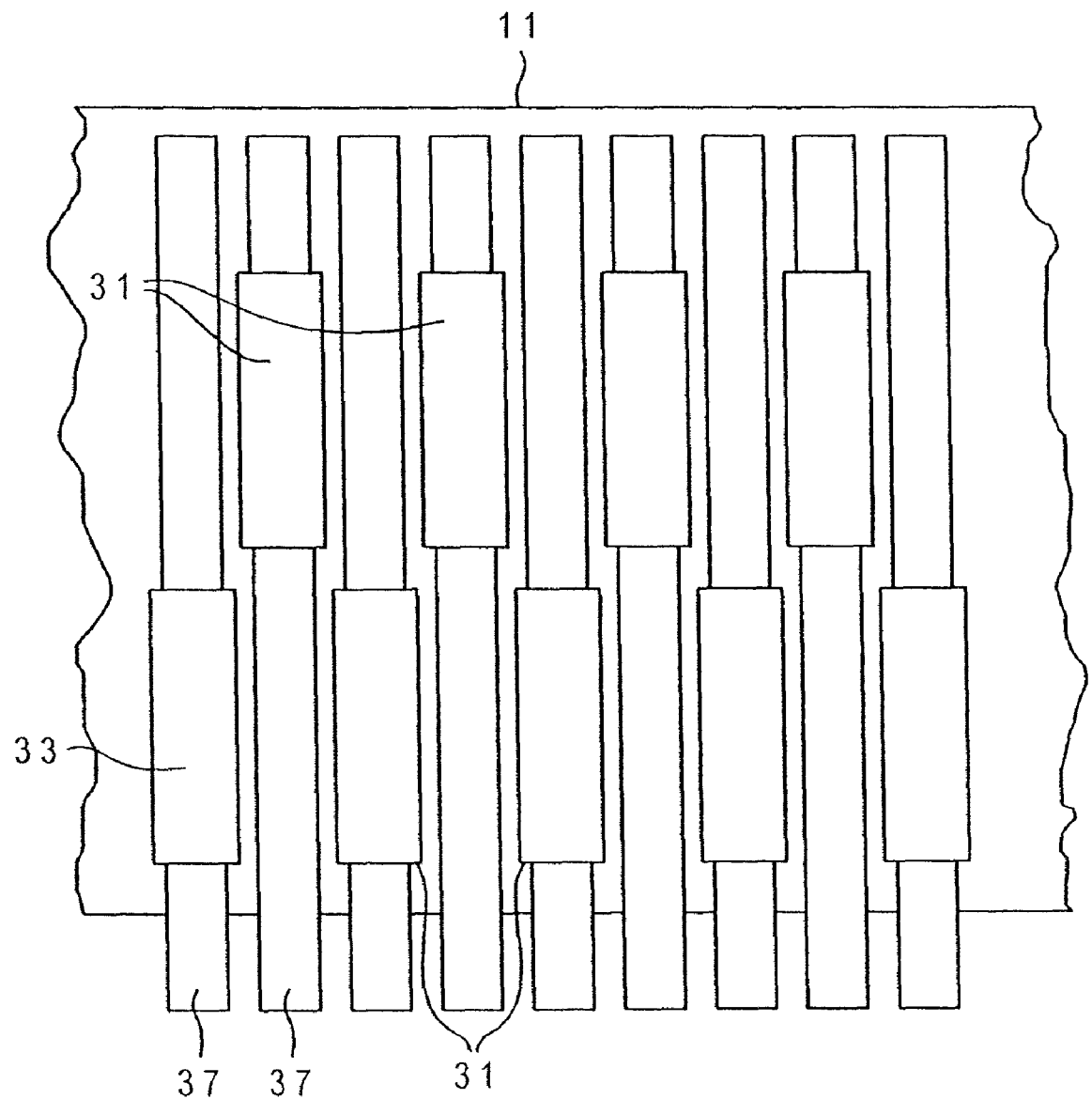
FIG. 6 shows an arrangement of piston-cylinders along a vessel side.

What makes a ship hull 11 particularly suited for reaping power from the tides is the large size of the vessel. The vessel has a large displacement (typically several thousands of tons, up to tens of thousands of tons). Thus, the force available is large, which in turn means that large amounts of electrical power can be generated. As shown in FIG. 6, a number of piston-cylinders 31 can be attached along each side of the vessel hull, with all sides having piston-cylinders. The cylinders 33 can be vertically staggered so as to allow for tighter packing and to increase the number of cylinders along a side of the hull. The piston-cylinders allow the vessel hull to move vertically, but constrain the vessel hull from moving horizontally.

The bottom of the vessel hull can be provided with piston-cylinders. Thus, the piston-cylinders or other linear-to-rotary converters, can be placed along the sides of the vessel hull and the bottom of the vessel hull.

Figure 7:
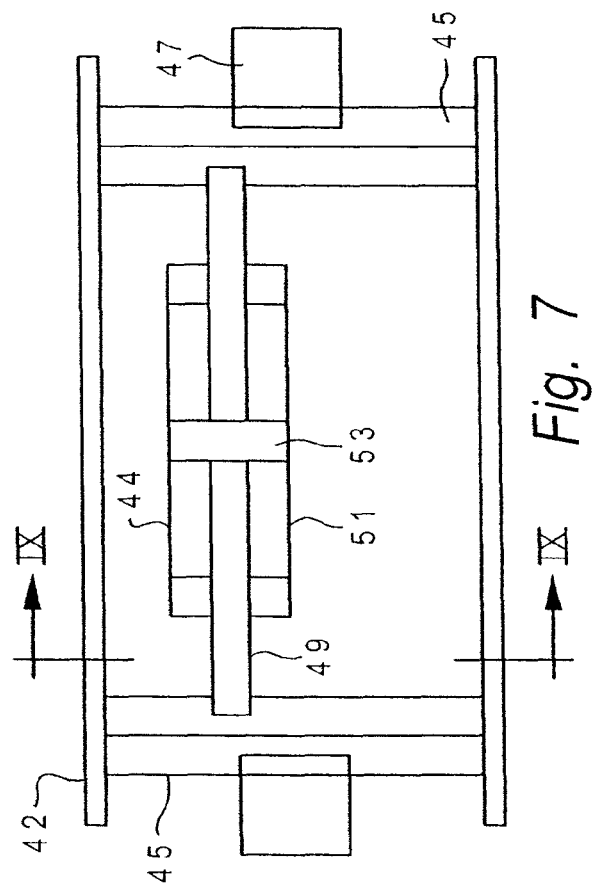
FIG. 7 is a longitudinal cross-sectional view of a master-slave cylinder arrangement, in accordance with another embodiment.
Figure 9:
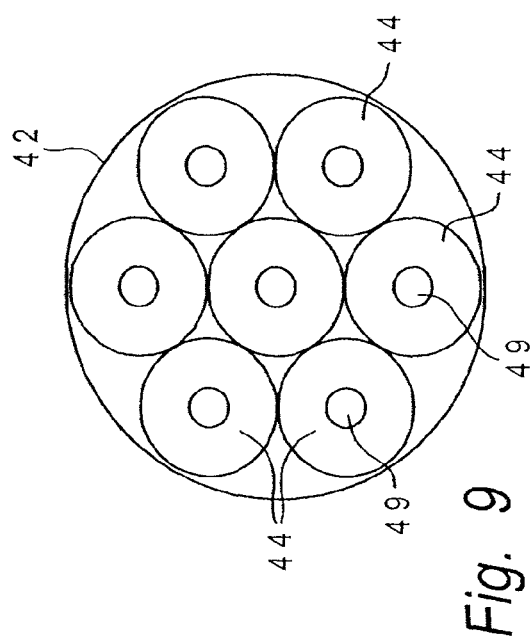
FIG. 9 is a cross-sectional view, taken at lines IX-IX of FIG. 7.
Figure 8:
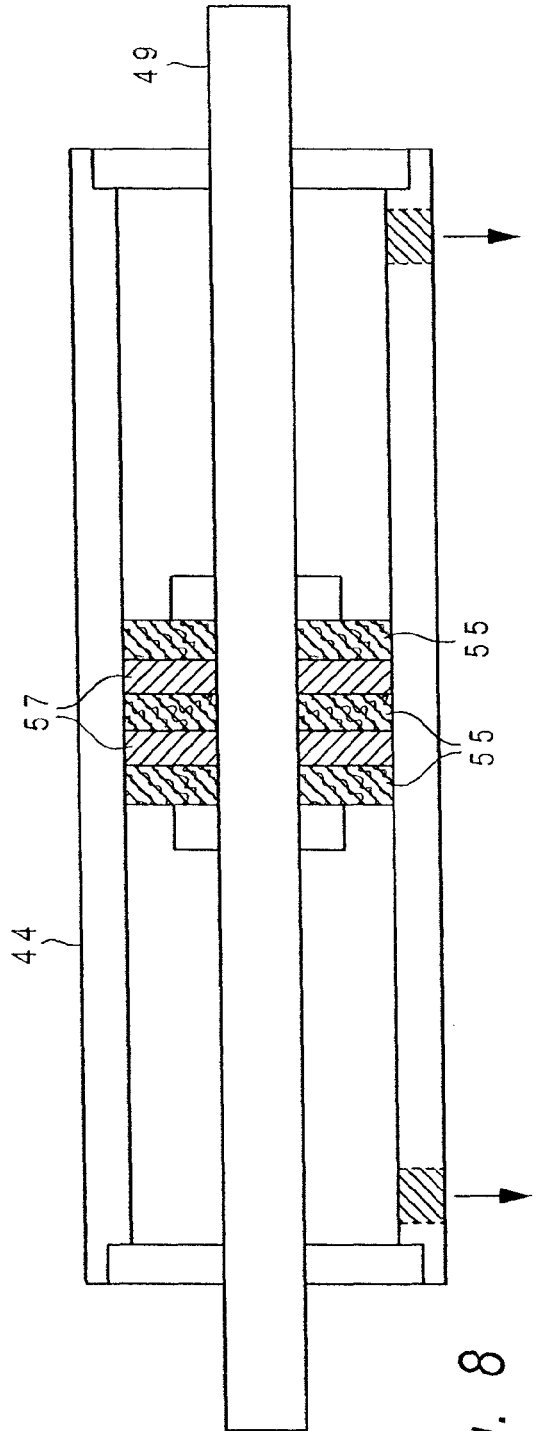
FIG. 8 is a longitudinal cross-sectional view of one of the slave piston-cylinders of FIG. 7.

FIGS. 7-9 illustrate another type of hydraulic cylinder. There is provided a master cylinder 42, or outer cylinder. A number of smaller cylinders, or slave cylinders 44, are provided on the inside of the master cylinder 42. The smaller cylinders 44 are ganged together so as to work in unison.

This master cylinder arrangement is useful where wide temperature ranges are experienced. Such wide temperature variations make cylinders prone to leakage around the pistons, particularly under high pressure.

The master cylinder 42 is equipped with two end plates 45, as shown in FIG. 7. The plates 45 are movable with respect to the master cylinder 42. The master cylinder 42 is configured as is the cylinder 33 shown in FIG. 5, in that the master cylinder moves with the hull 11 and the plates 45 and their rods 47 are fixed. The piston rods 49 of the slave cylinders 44 are attached to the master cylinder plates 45. The cylinders 51 of the slave cylinders 43 are attached to the master cylinder 42. Thus, any movement of the master cylinder also moves the slave cylinders 51 about their fixed slave pistons 53. The master cylinder protects the slave cylinders from the environment and provides some thermal protection.

FIG. 8 shows a slave piston 53. The piston 53 has ceramic or metal plates 55, interweaved with air or graphite plates or elements 57. This arrangement provides a seal, particularly under high pressures. The piston arrangement of FIG. 8 can also be used in a single cylinder and need not be used in a slave cylinder.

The slave cylinders 44 are packed into the master cylinder 42. FIG. 9 illustrates such an arrangement, where there is an outer ring of slave cylinders and a center slave cylinder.

Figure 10:
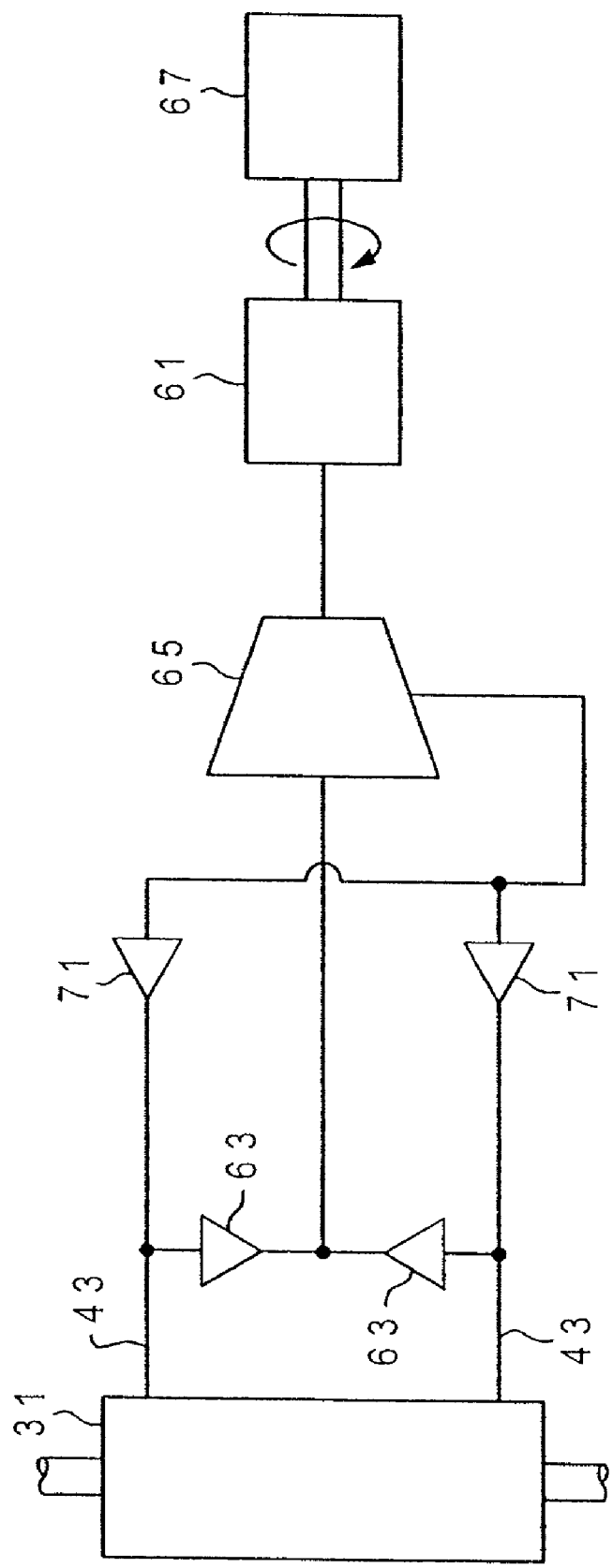
FIG. 10 is a schematic view showing the power generation system of the present invention, in accordance with a preferred embodiment.

FIG. 10 shows how electrical power is generated from a piston-cylinder 31. The pressurized hydraulic fluid is output from each piston-cylinder 31 into a turbine 65, impeller, compressor or gear motor, wherein the pressurized fluid does the work by imparting rotation to the turbine. An impeller is a wheel-like device having vanes or cups on its outer periphery. The pressurized fluid impacts the impeller to rotate the impeller. There is little or no leakage, or slippage, of the pressurized fluid past the vanes or cups in the impeller, thereby providing a high degree of efficiency. This rotation drives a gear box 61, which in turn drives an electric generator 67. One-way, or check, valves 63 are located in each line 43 between the cylinder 31 and the turbine 65. The valves 63 direct the pressurized fluid from the cylinder into the turbine and away from the low pressure side of the cylinder. Fluid exits the turbine 65 and returns to the low pressure side of the cylinder through check valves 71. An accumulator can be optionally used on the high pressure side of the cylinder. A low pressure accumulator can be optionally used on the low pressure side of the cylinder. Also, the lines 43 from several piston-cylinders 31 can be connected together to drive a single turbine. Because the cylinders are double acting, pressurized fluid is produced on both the rising and the ebbing tides.

The tides have slack periods, namely at high tide and at low tide. These slack periods are when the flow of water in a water body changes direction. During slack tides, no pressurized fluid is produced by the vessel. Also, the tides are not constant. Neap tides are lower than normal, while spring tides are higher than normal. Neap and spring tides occur over numerous cycles.

Because it is uneconomical to store large amounts of electricity in batteries, electricity must be produced as it is used. One way to smooth out the fluctuations in the tides and produce electricity constantly, or nearly so, is to regulate the water flowing through the ports 23 (see FIG. 4A) of the harborage 13. The ports are equipped with valves 25 that regulate the size of the openings. The ports are sized small enough, with the valves, to slow the filling of the harborage or release of water therefrom. For example, if high tide occurs at 6:00 am, with slack tide between 5:00 to 7:00 am, then the ports are sized so that the water continues to flow into the harborage until 7:00 am. The ports are sized by knowing the water capacity of the harborage and the height of the tides. At 7:00 am, the tide starts to recede and water begins to exit the harborage. A slack or low tide is between 5:00 pm and 7:00 pm, so water exits the harborage until 7:00 pm. In other words, the ports are sized to slow the flow of water in and out of the harborage. This allows the vessel hull 11 to almost always be moving either up or down. The short periods of time when the vessel changes direction can be compensated for by the high pressure accumulator 61. Because the height and speed of the tides vary, the valves 25 can be adjusted on a frequent basis.

Still another way to smooth out the tidal variations and slack tides is to retard the vertical movement of the vessel hull. For example, on a rising tide, the piston-cylinders can retard the rise of the hull. This can be accomplished by putting an orifice on the output lines 43 of the piston-cylinder, which orifice limits the amount of fluid exiting from the cylinder. Thus, as the vessel hull is being buoyed up by the rising water in the harborage, the piston-cylinders extend at a slower rate due to the resistance of the orifices, and effectively slows the ascent of the vessel hull. Conversely, as the water level in the harborage drops, such as due to an ebbing tide, descent of the vessel hull is slowed by contracting of the piston-cylinders, which contraction is slowed by orifices in the hydraulic lines. Regulating the fluid output of the piston-cylinders allows for smoother operation of the electrical generation equipment. The orifices can be fixed or variable.

Retarding, or resisting, the vertical movement of the vessel hull also alters the displacement of the vessel hull. For example, on a rising tide, the vessel hull displacement increases as the water line on the vessel hull moves up. On a receding tide, the vessel hull displacement decreases, as the water line on the vessel hull drops down. In both cases, potential energy is accumulated. This potential energy can be captured by opening the orifices and allowing the vessel hull to move to its normal displacement.

Regulating the flow of water in and out of the harborage or retarding vertical movement of the hull serve to desynchronize the vertical movement of the vessel hull from the tidal variations. Specifically, the vertical movement of the vessel hull lags the tidal variations. This allows energy to be stored and used during slack tides.

Figure 11:
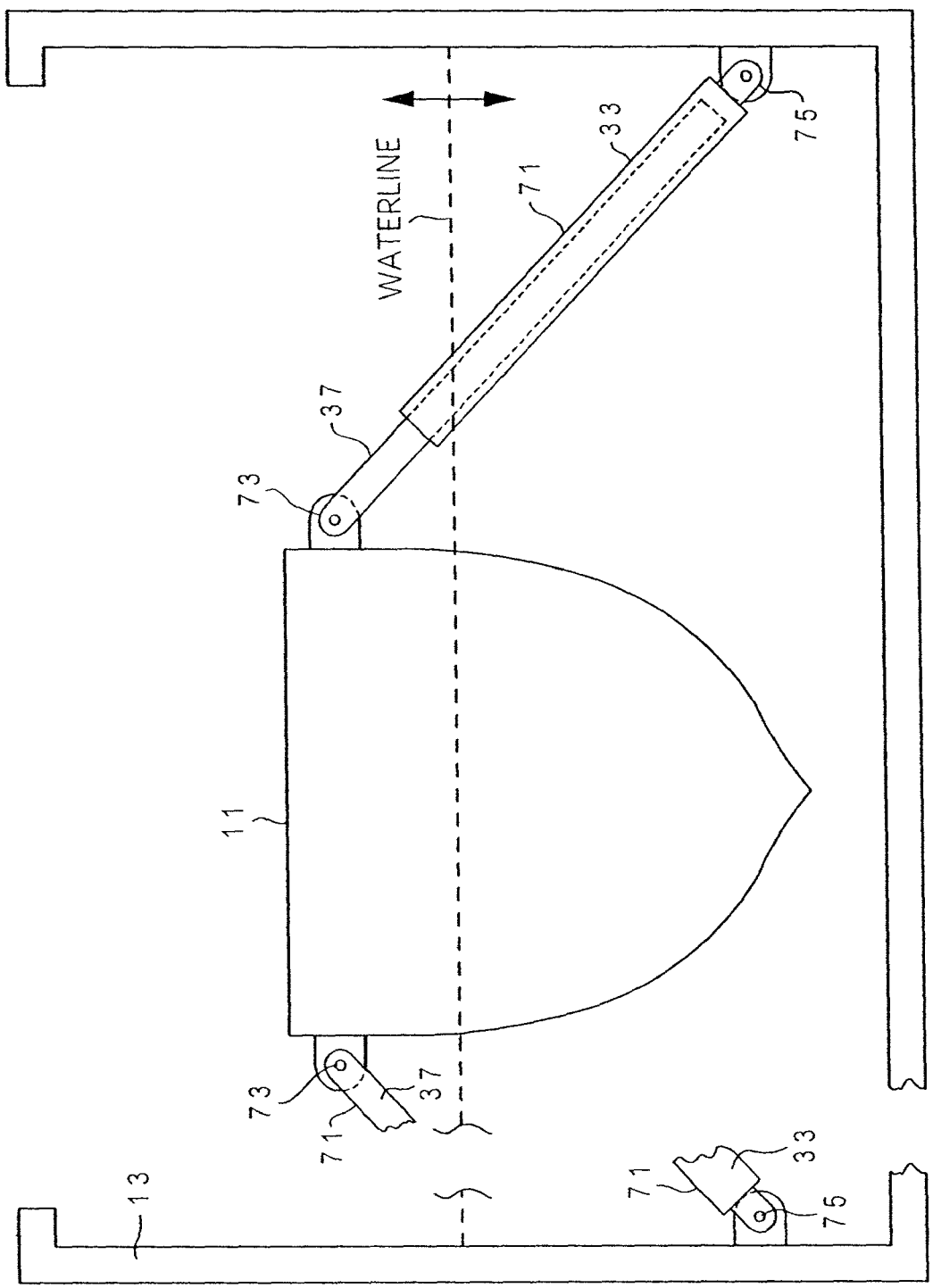
FIG. 11 shows a linear-to-rotary converter between the vessel and the harborage, in accordance with another embodiment.

FIG. 11 shows another converter, in accordance with another embodiment. The converter 71 is a hydraulic cylinder having two ends 73, 75. One end 73 is pivotally coupled to the vessel hull 11, while the other end 75 is pivotally coupled to a fixed object. The cylinder 71 has a piston contained therein. The piston can be a double acting piston or a single acting piston. All sides of the vessel wall will have the converters 71.

As the vessel rises and falls, the orientation of the cylinder changes. This causes the overall length between the two ends 73, 75 to change, thereby moving the piston within the cylinder and producing pressurized fluid. The hydraulic cylinders 71 minimize horizontal movement of the vessel hull so as to keep the hull centered or otherwise properly positioned in the desired location. The hydraulic cylinders 71 act as shock absorbers and reduce the stress on the hull. The hydraulic cylinder 71-vessel hull arrangement of FIG. 11 can be used without a harborage.

Figure 12:
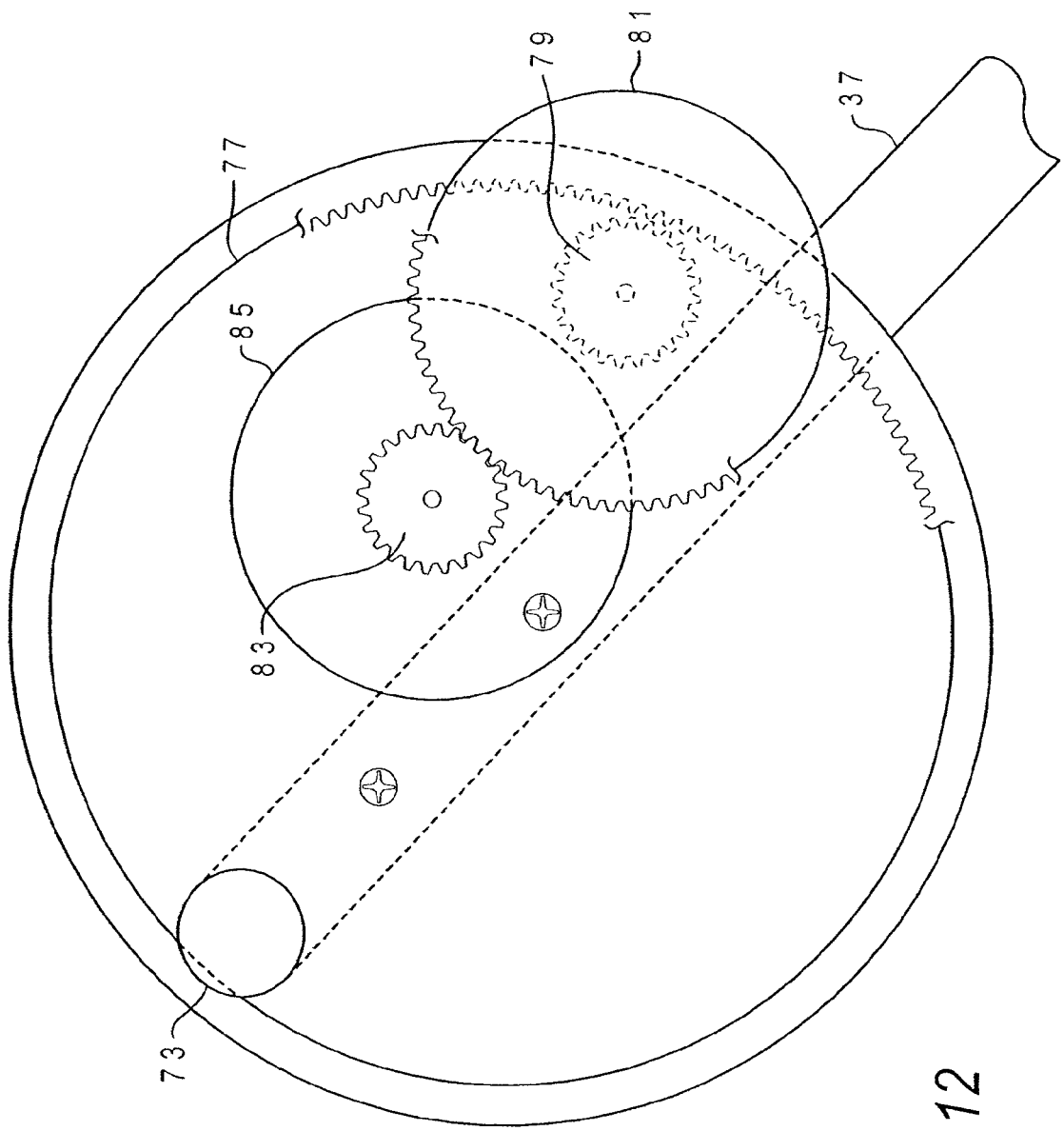
FIG. 12 is a detailed view of a gear arrangement used with the converter of FIG. 11.

The rotary movement of the piston-cylinder at the ends 73, 75 can be tapped for electrical generation. A set of gears is located at each end to amplify or increase the rotational speed. FIG. 12 illustrates one such gear amplifier. A primary gear 77 is fixed to the cylinder or arm at the respective end. The primary gear 77 and a secondary gear 79 form a planetary gear arrangement. Other gears 81, 83, 85 are used if needed to obtain the speed necessary to drive an electrical generator.

The present invention can also be used in non-tidal situations. The rise and fall of the tides can be emulated by a lock in a river or other downhill flowing water body. In a lock, a vessel hull is raised by filling the lock with water from upstream. The vessel hull is lowered by draining the water from the lock on the downstream side.

FIG. 4 illustrates a harborage that can be used as a lock. FIG. 4 shows an end view, such as from the downstream end. The main body of the lock receives the vessel hull. Doors on hinges are shown on the downstream end. Both ends, the downstream end and the upstream end, have ports (or ducts or channels) for the ingress and egress of water to and from the harborage or lock. The ports have valves so as to control the flow of water through the ports.

In operation, the upstream ports are opened to allow water to flow into the lock. The vessel hull rises. Linear-to-rotary converters, such as the piston-cylinder arrangements described above, convert the upward movement of hull to rotary movement. Once the hull is at its maximum vertical height, the upstream ports are closed and the downstream ports are opened to release water from the lock. The vessel hull drops in elevation and the linear-to-rotary converters convert the downward movement of the hull to rotary movement. In lieu of ports in the doors, the upstream doors can be opened to admit water to the lock, while the downstream doors can be opened to release water from the lock.

The linear-to-rotary converters described herein limit the horizontal movement of the vessel hull. Thus, for example, in the lock arrangement, the doors can be opened and the vessel remains inside, merely rising or falling in a vertical manner. The vessel thus stays in the lock.

Because the vessel hull need not move horizontally, the vessel hull can be designed so as to maximize the displacement-to-perimeter ratio. For example, with an ocean going ship, the hull is tapered, especially at the bow and stern sections. The vessel hull in a lock or harborage can be boxlike in order to maximize its displacement. The perimeter of the hull, where the linear-to-rotary converters connect to, can be small relative to this displacement. By so maximizing the displacement-to-perimeter ratio, the vertical rise and fall of the vessel hull can be fully taken advantage of.

An advantage of the lock arrangement is that the frequency of vertical hull movement is independent of the tides. In some locations, a tidal cycle of a high tide and a low tide may span 24 hours. This allows only a single rise and a single fall of the vessel hull. With a lock positioned by a water body with some head relative to sea level, such as at a dam or in a river, the number of rises and falls of the vessel hull can be increased over a 24 hour period, thereby generating far more energy.

The lock of FIG. 4 shows two lateral canals. These are optional and allow water to flow on one or both sides of the lock.

The harborage can be used as a lock or as an ancillary device to a lock. In a lock, a vessel is transported between an upper water level and a lower water level. As an ancillary device to a lock, the water from the lock is discharged into the harborage. The vessel hull in the harborage is raised by the water discharged from the lock. To lower the vessel hull, water is discharged from the harborage. Thus, vessel transport can be accommodated by the lock, while power can be generated by the water used in the lock. The harborage can be at the same elevation as the lock, wherein, the water level in the harborage can only rise to part of the elevation of the upper water level. When the two water levels in the lock and harborage are equal, the remaining water in the lock is discharged downstream and not into the harborage. Alternatively, the harborage may be set at a lower elevation than the lock so as to achieve a higher vertical movement of the vessel hull.

The harborage can also be used independently of a lock. For example, a river has a drop in elevation over some distance. Water from upstream, the upper water level, can be conveyed by a channel or conduit independent of the river channel to the harborage, and water can be discharged from the harborage to a lower water level in the river by conduit or channel.

Figure 13:
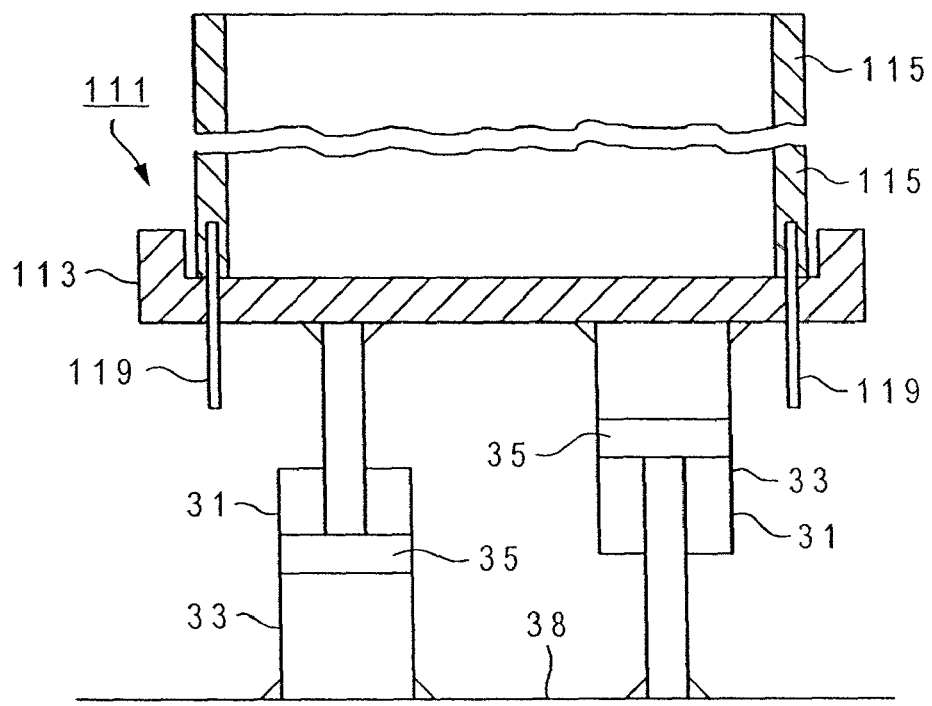
FIG. 13 is a view of the vessel hull, in accordance with another embodiment.

FIGS. 13-17 show the vessel hull 111 in accordance with another embodiment. The linear-to-rotary converters can be coupled to the bottom of the vessel hull, as shown in FIG. 13. The converters are shown as piston-cylinder arrangements 31. The cylinders 33 can be coupled either to earth 38 (shown on the left side of FIG. 13) or to the vessel hull (shown on the right side of FIG. 13), while the pistons are coupled to the opposite member of the cylinder.

The vessel hull 111 is unique in that its displacement changes, depending upon its vertical position. On a rising water level, the displacement of the vessel hull is lower than when the water level is dropping. Because the displacement changes, more energy can be extracted from the vertical movement. On a rising water level, the lower displacement exerts a greater pull on the piston-cylinder arrangements 31. This results in higher pressures developed by the piston-cylinder arrangements 31. On a falling water level, the heavier displacement exerts a greater push on the piston-cylinder arrangements, once again providing higher pressures therefrom. The vessel hull 111 need not have a harborage and can be used in salt or fresh water environments (such as a lock).

The vessel hull 111 has a base 113 and side walls 115. The base 113 and side walls 115 form a container that can hold water. The container is interior of the vessel hull. The top of the vessel hull can be either open or closed with a deck. If closed, a vent to the interior is provided to allow the taking on and discharge of water to and from the interior. The bottom of the side walls 115 is open, unless closed by the base 113. A seal 117 is provided between the side walls and the base to form a water-tight container. The base 113 floats and has positive buoyancy, while the side walls 115 have neutral buoyancy, or even negative buoyancy.

Figure 14:
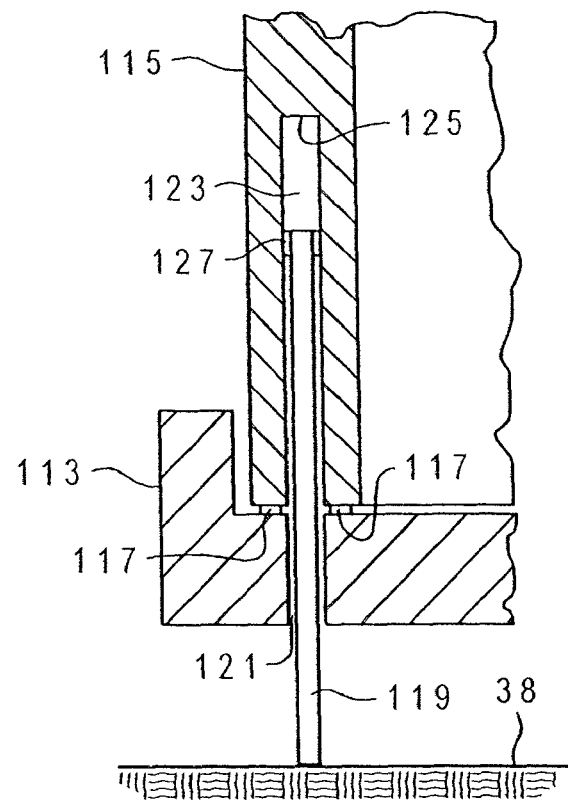
FIG. 14 is a detail view showing a vertical guide for the vessel hull of FIG. 13.

As shown in FIG. 14, the vertical movement of the vessel hull is along guides 119 or posts. The posts 119 are securely anchored to the earth 38. The base 113 has openings 121 therethrough for receiving the posts 119. The base can move vertically along the posts. Seals or bushings (not shown) are provided in the base openings to limit the leakage of water therethrough. The side walls 115 have cavities 123 therein, which cavities are open at the bottom of the side walls and receive the upper ends of the posts 119. The thickness of the side walls at the cavities can be increased in order to accommodate the cavities. Each cavity 123 has a top end 125 which acts as a stop to the lower movement in the side walls. The base has no such limitation on its lowermost movement. The upper end of each post has a stop 127 for limiting upper movement of the base and the side walls. The stop for limiting the upper movement can be on the exterior of the vessel hull, such as a wall that contacts the upper side of the side walls. Likewise, the stop for limiting the lower movement of the side walls can also be exterior of the vessel hull.

Figure 16:
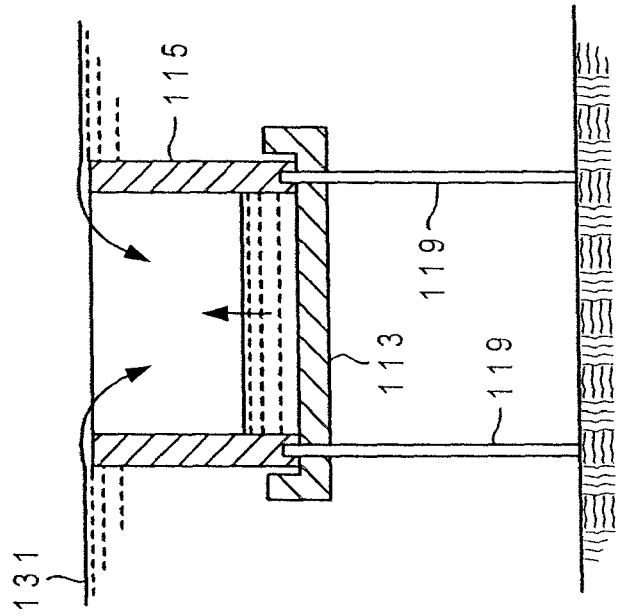
FIGS. 15-17 show the vessel hull of FIG. 13 in various vertical positions.
Figure 15:
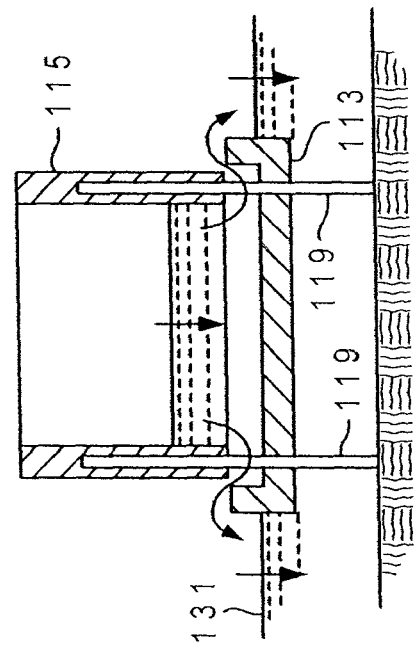
Figure 17:
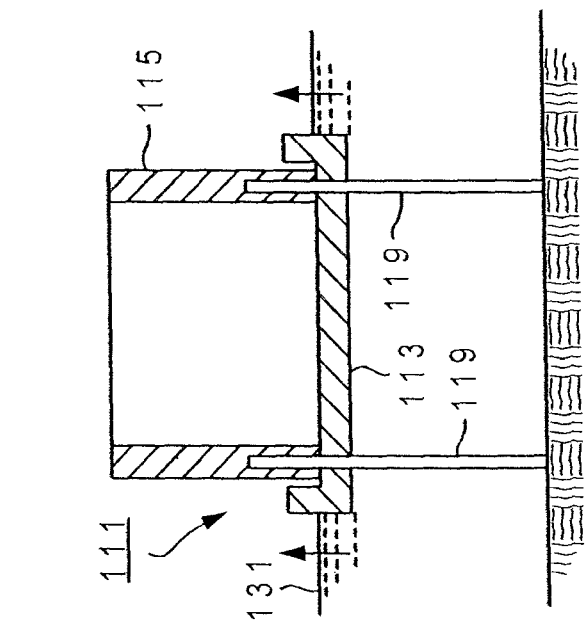

The operation of the vessel hull 111 will now be described with reference to FIGS. 15-17. FIG. 15 depicts the vessel hull 111 on a rising water level 131. The base 113 and side walls 115 are together and form a water-tight vessel hull. The vessel hull is empty of water and thereby floats high on the water, following the water up in vertical elevation, guided by the posts 119. The piston-cylinder arrangements 31 create pressurized fluid from this vertical movement.

The upward movement of the vessel hull is limited by stops 127 (see FIG. 14) on the posts 119. The stops engage the base (or optionally the side walls) and prevent the vessel hull from floating up beyond a top position. Because the side walls are not positively buoyant, the side walls stay engaged on the base as the water rises.

The upper limit of the vessel hull is designed so that the water level can continue to rise along the side walls 115 of the vessel hull. As shown in FIG. 16, when the water rises high enough, the water enters the vessel hull either over the top rim or through ports. The ports can be set below the top rim of the vessel hull to prevent complete filling of the vessel hull and maintains some positive buoyancy. The addition of water to the vessel hull increases the mass and thus the displacement of the vessel hull.

When the water level falls outside of the vessel hull, the vessel hull drops in elevation, along the posts 119 and the piston-cylinder arrangements 31 create pressurized fluid. The top ends of the posts then contact the stop surfaces 125 (see FIG. 14) in the side walls to limit the downward movement of the side walls. The base has no such limitation and continues its downward motion. Thus, the base separates from the side walls, breaking the seal so as to form a port or opening and allowing the water inside the vessel hull to discharge, as shown in FIG. 17. The water level outside the side walls will drop to a position where the base breaks free of the side walls.

On the next rising water level, the base rejoins with the side walls, being pushed up by the water level to engage the side walls and form a water-tight vessel hull once again. The base 113 is preferably provided with a lip around the outer periphery thereof.

The vessel hull can also be provided with ports in the nature of those shown in FIG. 4A. That is to say, that the vessel hull can be provided with ports equipped with turbines so that as water flows in and out of the vessel hull, this flow can be used to generate rotational movement and in turn used to generate electrical power.

Figure 18:
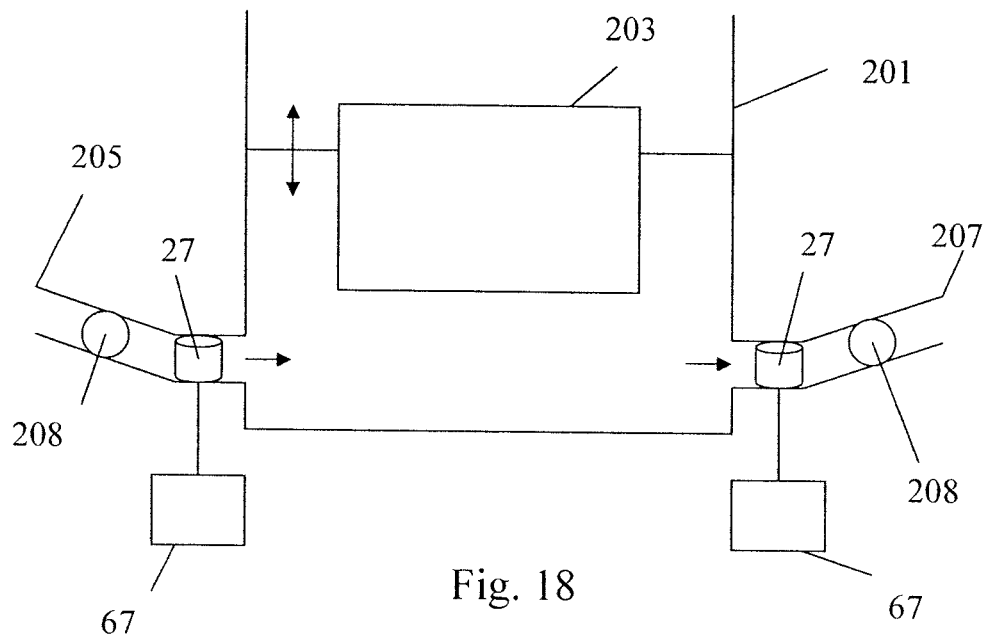
FIG. 18 shows a lock or harborage, in accordance with another embodiment.
Figure 19:
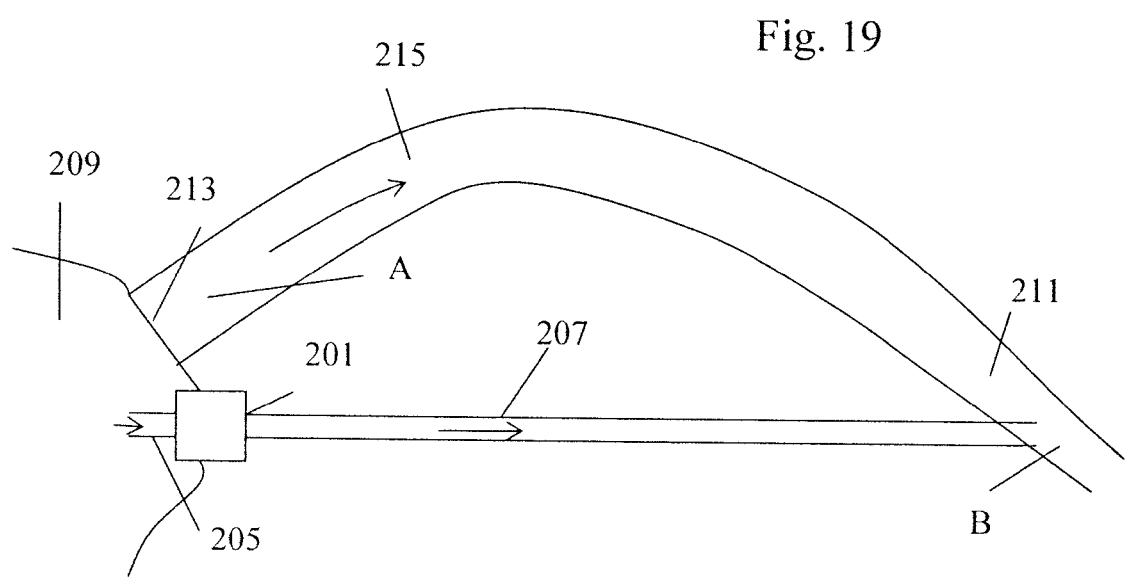
FIG. 19 shows the lock or harborage of FIG. 18 installed in a river environment, in accordance with one embodiment.

FIGS. 18 and 19 show a lock or harborage 201 used in conjunction with a river environment. The lock or harborage 201 has a vessel 203 therein. When used as a harborage, the vessel 203 remains inside as the level of water rises and falls. The vessel is connected to linear-to-rotary converters as discussed above. When used as a lock, the vessel 203 passes through, using the lock to raise or lower to a desired elevation. The vessel in lock is typically not connected to linear-to-rotary converters. Whether used as a harborage or lock 201, power is generated from water flowing into and out of the harborage or lock (hereinafter referred to as a "harborage").

The harborage 201 has an inlet conduit 205 and an outlet conduit 207. The inlet or outlet conduits 205, 207 are provided with valves 208. The inlet conduit 205 extends to a first body of water 209, while the outlet conduit 207 extends to a second body of water 211. The elevation of the first body of water 209 is higher than the elevation in the second body of water 211, thus creating a pressure differential or head. A turbine 27 is located in either the inlet conduit 205, the outlet conduit 207 or both. The turbine 27 is connected to an electrical generator 67 as described above. The turbine 27 rotates and generates electrical power when the water flows through the respective conduit. If the harborage 201 is filling, water flows into the harborage via the inlet conduit 205. The flowing water rotates the turbine 27 in the inlet conduit. The turbine in turn drives an electrical generator 67 to produce electrical power. The outlet conduit 207 is closed during filling of the harborage. The water level in the harborage 201 rises, as does the vessel. If the water level in the harborage 201 is lowered, water flows through the outlet conduit 207, rotating the turbine therein. The inlet conduit 205 is closed during emptying of the harborage. The water level inside of the harborage falls, thereby lowering the vessel 203. If the vessel 203 is coupled to a linear-to-rotary converter, then electrical power can be produced from filling and emptying the harborage and raising and lowering the vessel 203.

The head across the turbine 27 and thus the amount of energy that can be extracted can be increased by extending one or more conduits 205, 207 to a body of water with a more extreme head. Referring to FIG. 19 for example, the harborage 201 is located near a dam 213. The inlet conduit 205 thus draws water from the lake 209 impounded by the dam. Suppose that the level of lake 209 is 458 feet above sea level. The outlet conduit 207 can drain to the water below the dam. Suppose that the water level immediately below the dam (point A) is 412 feet above sea level. The water level 6.7 miles downstream from the dam is 405 feet. If the outlet conduit 207 discharges immediately below the dam, the head would be 46 feet. If the outlet conduit discharges several miles downstream from the dam, at point B in FIG. 19, the head would be 53 feet. Thus, the head is increased by extending the outlet conduit 207 further downstream. Likewise, the harborage can be located at a lower elevation, such as at point B, downstream from the dam, while the inlet conduit 205 is located at the impounded lake 209.

The harborage 201 and conduits 205, 207 can be used without a dam.

FIG. 19 illustrates that the conduits 205, 207 can be located outside of the stream or river bed 215. The conduit can cut across a bend in the river. This shortens the amount of conduit needed. For example, if the river 215 is 6.7 miles from point A to point B, which river bed has a curve or bend, the conduit, without curves, is only 3.88 miles from point A to point B.

Figure 20:
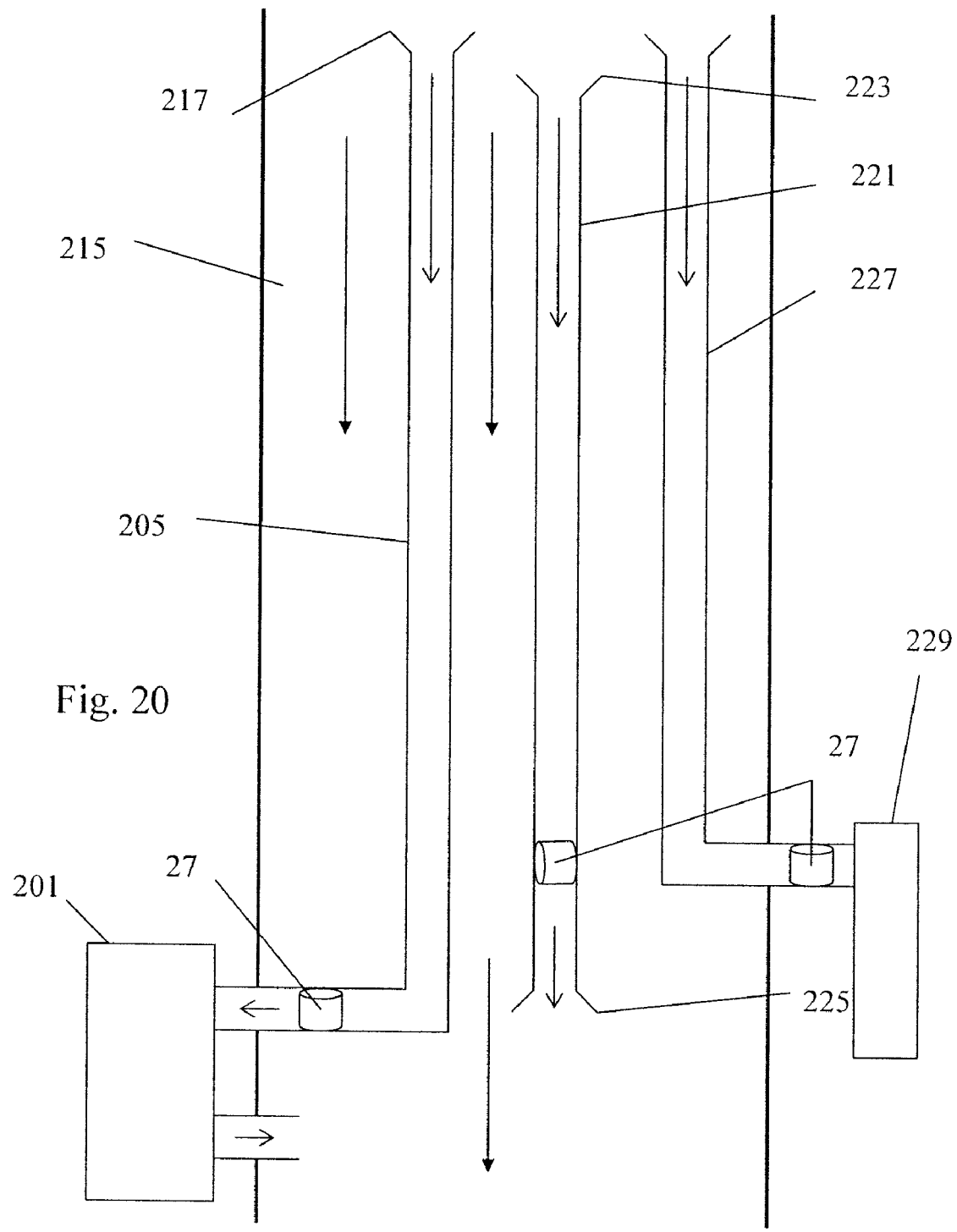
FIG. 20 is another embodiment that shows conduits in the bed of the river, which conduits have power generating turbines therein.

FIG. 20 illustrates the conduit 205 located within the river bed 215. This is particularly useful where the river is straight, but can also be used on a river with bends and curves. In FIG. 20, the harborage 201 is located downstream. The conduit 205 has a turbine 27 therein, located near the harborage 201. The conduit can be submerged so as to be out of sight and so as not to interfere with navigation. The upper end of the conduit has a collector 217 so that some water flowing downstream will enter the conduit. The upper end, or intake end, can be elevated from the river bottom in order to minimize the amount of silt collected by the conduit.

FIG. 20 also illustrates the use of conduits and turbines without harborages. A conduit 221 has an upper end 223 at a first elevation and a lower end 225 at a second elevation, which is lower than the first elevation. The upper end 223 collects water, which water flows through the conduit due to the drop in elevation. The flowing water turns the turbine 27, which turbine then generates electrical power by way of a generator. The water is discharged back into the river. Thus, the conduit 221 is similar to the conduit 205, except as to where the water is discharged. The conduit 205 discharges into a harborage, while the conduit 221 discharges into the river.

The lower end 225 of the conduit 221 has a venturi. The venturi, or expander, causes a pressure drop after the turbine 27. The venturi is useful for increasing the pressure differential or head across the turbine. The venturi is particularly useful in increasing head in a river or stream bed that is relatively flat or has a low head. The venturi need not be located at the lower end of the conduit, but can be located upstream or above the lower end.

Another conduit 227 is similar to conduit 221 but discharges into a water utilization system 229, such as a water treatment plant. Conduit 227 is especially useful for bringing water from a pure source downstream to where the river is polluted.

The conduits 205, 207, 221, 227 of the present invention do not interfere with the flow of water in a river bed or channel. This is a distinct advantage over building a dam, which necessarily interferes with the flow of water by virtue of the fact that the water is impounded by the dam. Furthermore, the building of a conduit or pipeline is less expensive than the building of a dam. A conduit or pipeline can create the same head or pressure as the dam but without the capital expense. In addition, because water is not impounded, thereby not altering the riverbank, the conduit of the present invention will not affect wildlife or populations located along the banks of the river as does the dam. Furthermore, because the water flow is not impeded by the conduit, as it is with the dam, there is no silting problem. With dams, as water enters the reservoir impacted by the dam, the water typically contains a load of silt which is deposited on the bottom of the reservoir. Over a period of years, this silt builds up and diminishes the capacity of the reservoir.

Figure 21:
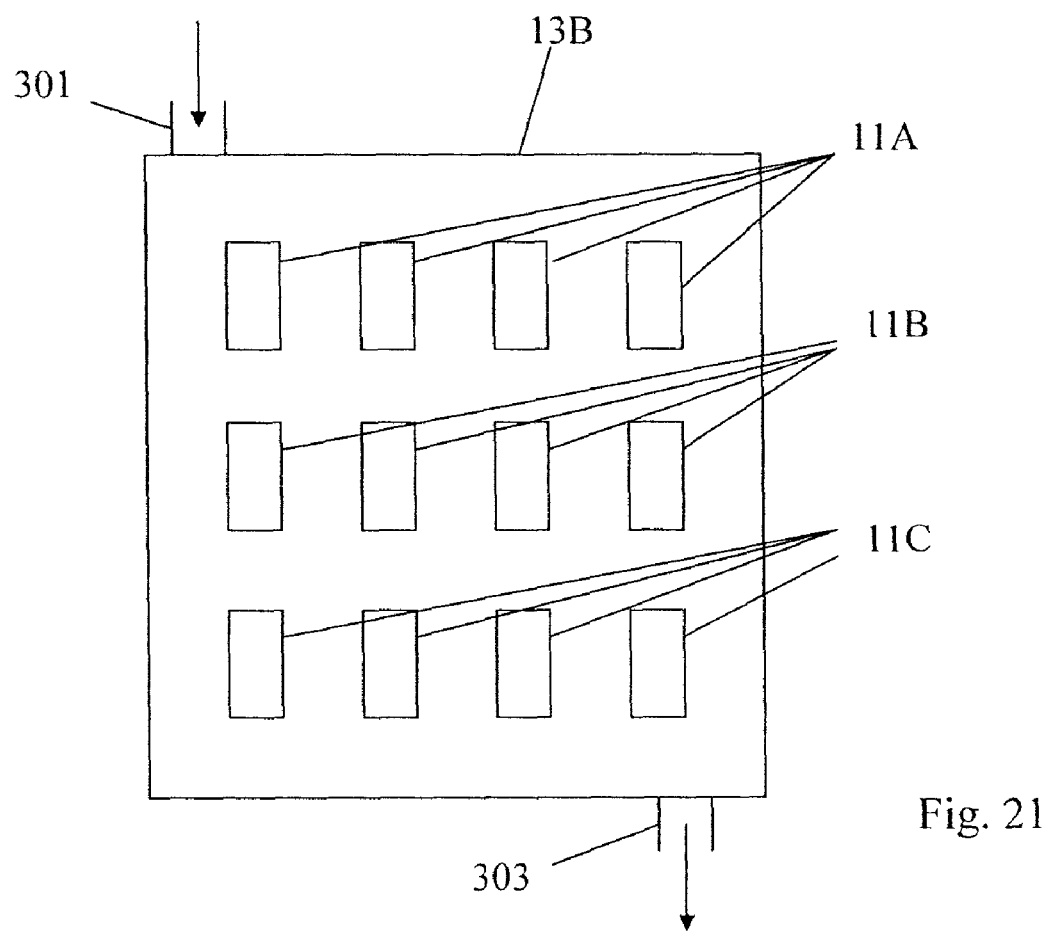
FIG. 21 is a view of a harborage with a plurality of vessel hulls inside.
Figure 22:
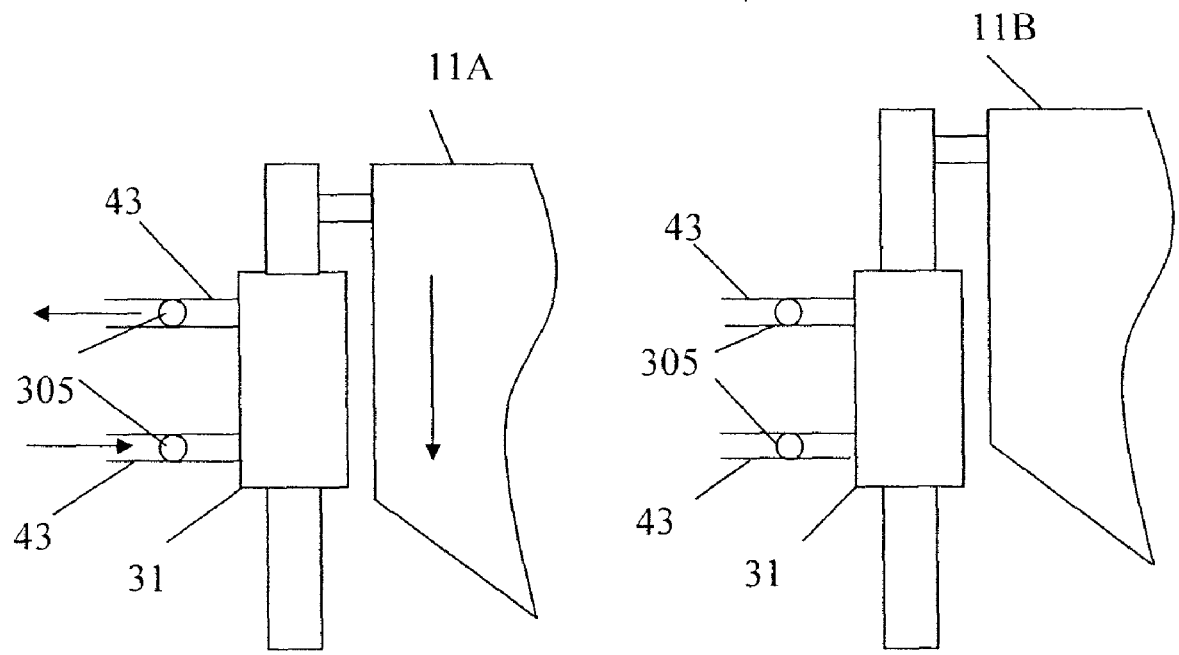
FIG. 22 shows two piston cylinders, as used on two vessel hulls in FIG. 21, with one piston cylinder operating to allow its vessel to move up and down, while the other piston-cylinder is locked to retard the vertical movement of its vessel.

A harborage 13B can contain two or more vessel hulls 11, as shown in FIG. 21. Each vessel hull 11 is equipped with one or more piston-cylinders 31, as shown in FIG. 22. The harborage 13B can be located so as to be subjected to tidal variation. As discussed, the harborage can be located in a bay or other salt water body, or exposed to salt water. Alternatively, the harborage can be located so as be exposed to fresh water, such as along a river. The harborage 13B has ports in the form of an inlet 301 and an outlet 303. If the harborage is subjected to river water, the inlet is at a higher elevation (an upstream location) than the outlet (a downstream location). If the harborage is subjected to tidal variation, then separate inlets and outlet are not needed as one port can serve to both allow water in the harborage and exit the harborage. The inlet 301 and outlet 303 have valves 304.

The vertical movement of the hulls 11 can be retarded so as to store energy. One way to retard the vertical movement is by opening and closing the inlet 301 and outlet 303. This has been discussed above with respect to tidal variations, as the water level inside of the harborage can be controlled independently of the water level outside the harborage by opening and closing valves in the ports 301, 303.

Another way to retard vertical movement of the hulls 11 is by equipping the lines 43 from the piston-cylinders 31 with valves 305. The vertical movement of each vessel hull can be independently controlled relative to the other vessel hulls. For example, the harborage can be flooded with water, causing all of the vessels 11 to rise. The water in the harborage can be lowered by opening the outlet 303. Some of the vessel hulls 11A have their valves open and these hulls fall as shown in FIG. 22. Other vessel hulls 11B have their valves 305 closed and these hulls remain up, even as the water level falls. At some later time, these hulls 11B can be lowered by opening the valves. By regulating the rise and fall of individual hulls 11, or groups (11A, 11B, 11C) of hulls, the stored energy can be used over a period of time, thus regulating the production of power.

Figure 23:
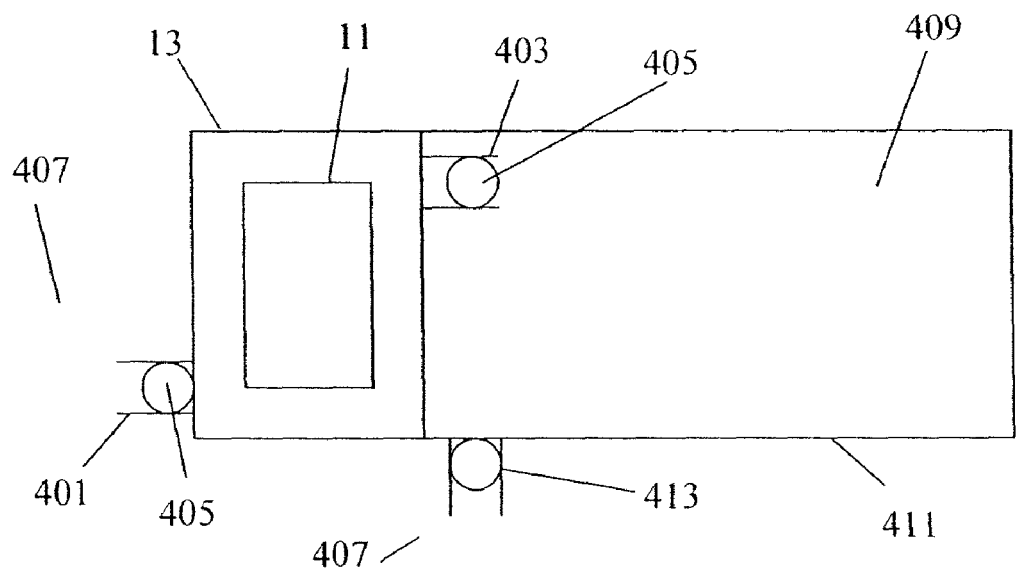
FIG. 23 is a top plan view of a harborage subjected to tidal variations.
Figure 24:
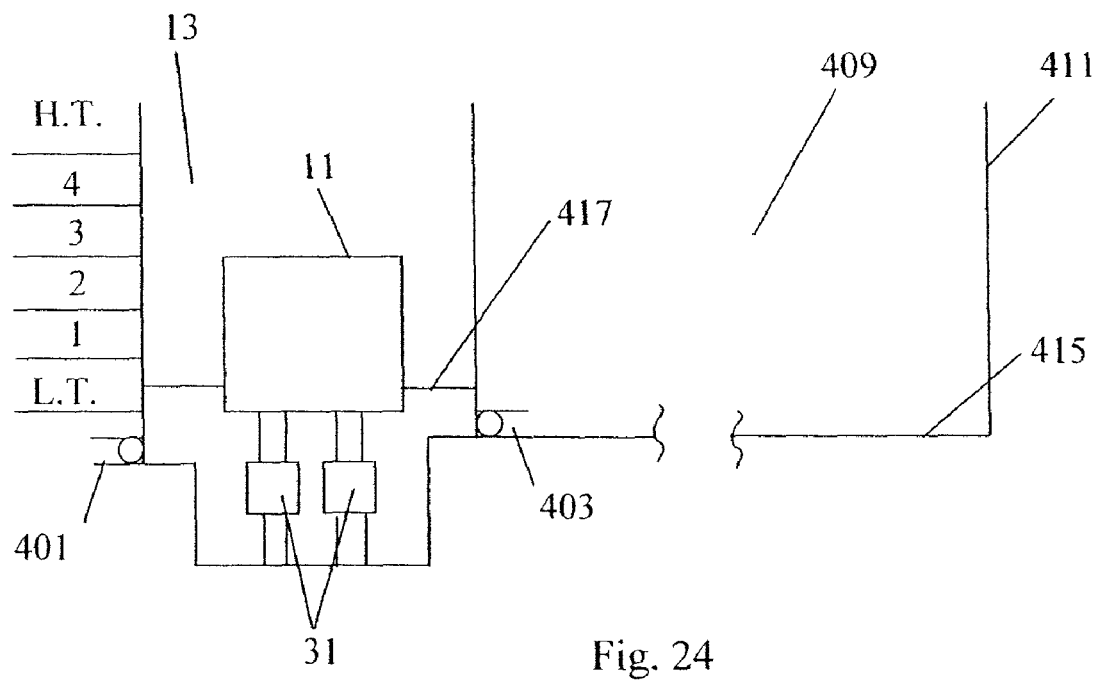
FIG. 24 is a side cross-sectional view of the harborage of FIG. 23.

FIGS. 23 and 24 show a harborage 13 subject to tidal variations. Tides rise (flood) and fall (ebb) over several hours. For example, from low tide to high tide, the rise in water level typically takes about six hours. Likewise, the fall in water level from high tide to low tide also takes about six hours. The present invention regulates the flow of water into and out of the harborage and allows the vessel 11 to rise and fall several times during a single rising tide, thereby extracting more energy than previously obtainable. Likewise, the present invention allows the vessel to rise and fall several times during a single falling tide.

Referring to FIG. 23, the harborage 13 has an inlet 401 and an outlet 403. Both the inlet and the outlet have a valve 405 for controlling the flow of water. The inlet 401 communicates with a body of water 407 that is subject to tidal variations, such as a bay. The outlet 403 communicates with a discharge pond 409 that is isolated from the water body 407 by a wall 411. The discharge pond 409 communicates with the water body 407 by a valved outlet 413. The inlet 401 and the outlets 403, 413 are located at or near ground 415 level. The inlet 401 and outlets 403, 413 are sized to achieve high flow volumes. There may be multiple inlets and outlets. The valves in the inlets and outlets can be operated independently so that one inlet can be operated while the other inlets are closed and likewise for the outlets. There can be several discharge ponds, separated from one another by walls or levees. The discharge ponds can be interconnected by valved ports and can all drain to the body of water 407.

The outlet 413 can drain to the body of water 407 at a location near the shore. Alternatively, the outlet 413 can drain to the water body 407 at an offshore location. The water level is believed to be lower offshore than it is near to shore, particularly at low tide. For example, the outlet can extend a mile or so offshore to take advantage of the lower tide level offshore and thus the lower head. The difference in water level at the drainage pond and at an offshore location will depend on a number of features such as the underwater geography.

The harborage 13 contains one or more vessel hulls 11. The vessel hulls 11 can be fixed displacement or variable displacement, as discussed above. Each vessel hull 11 has a piston-cylinder 31 arrangement to produce pressurized fluid as the hull rises and falls.

The discharge pond 409 is larger than the harborage 13 in terms of area and volume. The discharge pond 409 accepts water from the harborage 13 without an appreciable rise in water level inside of the discharge pond.

Figure 25:
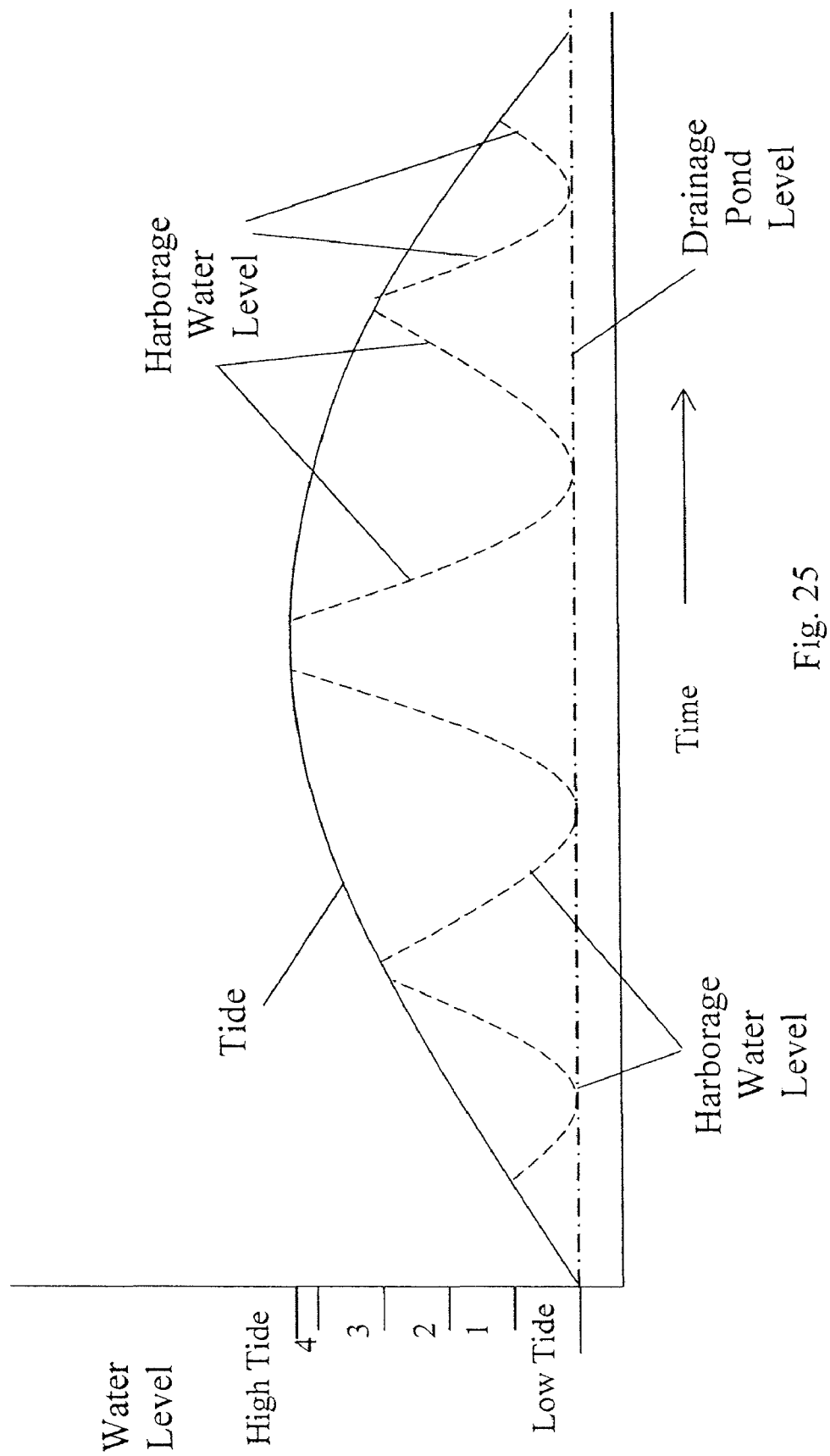
FIG. 25 is a graph showing the water level inside of the harborage during a rising and falling tide.

Referring to FIGS. 23-25, the operation of the harborage 13 will now be described. On a rising tide, the water level outside the harborage will rise from a low tide elevation to a high tide elevation, with several intermediate positions (tide level 1, tide level 2, tide level 3, tide level 4). As the tide rises from low tide to tide level 1, the inlet 401 of the harborage is opened, the harborage outlet 403 is closed and the water level 417 inside the harborage rises. Consequently, the vessel 11 rises and power is generated by the piston cylinders 31. (In FIG. 25, the harborage water level, when differing from the tide level, is shown in dashed lines.) When the water level reaches tide level 1, the inlet 401 is closed and the outlet 403 is opened. The water in the harborage 13 thus drains into the drainage pond 409. The vessel 11 falls on the falling water level, generating power. By the time the water from the harborage has emptied into the drainage pond 409, the tide outside of the harborage has risen to tide level 2. The harborage outlet 407 is closed and the harborage inlet 401 is opened. Water thus flows into the harborage from the water body 407 and the water level 417 inside of the harborage rises. The vessel 11 rises as well, generating power. As shown by FIG. 25, the water level inside of the harborage from tide level 2 to tide level 3 rises faster than the tide outside of the harborage. When the water levels inside and outside the harborage are equal or close to being equal, designated as tide level 3, the harborage inlet 401 closes and the outlet 403 opens. Water from inside the harborage drains into the drainage pond 409. The water level and the vessel in the harborage fall, thereby generating power. The harborage will drain back down to the low tide level, if the discharge pond is large enough. If the discharge pond is not sufficiently large, then the harborage water level will fall to the level of the discharge pond. After the harborage water level has fallen to its lowest level, the outlet 403 is closed. The tide is now at tide level 4; the inlet 401 is opened. The water level in the harborage 13 then rises at a faster rate than the tide. At high tide, the tide is at its peak. Once again, the vessel rises on the rising water level and generates power.

Thus, the vessel can rise and fall several times during a single rising tide from low tide to high tide by taking advantage of the different water levels between the water body 407 and the discharge pond 409. Consequently, more power can be produced. During the rising tide, the discharge pond outlet 413 remains closed.

As the tide falls, the harborage 13 can continue to take advantage of the different water levels between the water body 407 and the discharge pond 409, allowing the vessel to rise and fall several times. Once again, the discharge pond outlet 413 remains closed as the tide falls.

As the tide falls from high tide, the harborage inlet 401 is closed and the outlet 403 is opened to drain the water from the harborage 13 into the discharge pond 409. The vessel 11 thus falls faster than the tide in the water body. When the water in the harborage stops draining at tide level 4, the harborage outlet 403 is closed and the inlet 401 is opened. The water level in the harborage 13 thus rises to the level of the tide, tide level 3. Likewise, the vessel 11 rises and power is produced. The harborage inlet 401 is then closed and the outlet 403 is opened to drain the harborage into the discharge pond. The harborage water level falls as does the vessel 11 and power is generated. At tide level 2, the harborage is drained as low as possible and the outlet 403 is closed. The inlet 401 is opened and the outlet 403 closed to allow the harborage water level to rise. The vessel also rises, producing power. At tide level 1, the water level inside of the harborage is the same as the tide level. The inlet 401 can remain open so that as the tide falls, the water level inside of the harborage will also fall by exiting back to the water body 407. The vessel falls as well producing power. Alternatively, if the water level in the discharge pond is lower, the harborage can be drained into the discharge pond as the tide falls to low tide.

At or near low tide, the discharge pond outlet 413 is opened so as to drain the water inside of the discharge pond 409 into the water body 407. The discharge pond will typically be provided with a number of outlets 413 in order to drain the discharge pond during the relatively short low tide time period. Once the discharge pond is drained, the outlet 413 is closed and the cycle is then repeated. If a long outlet extending offshore is used, then the level of water can be dropped even lower than local, inshore low tide. A long outlet extending offshore can be used for the harborage as well in order to drop the water level inside the harborage at low tide to the offshore level.

The valves in the inlet 401 and outlet 403 need not be opened and closed at the same tide levels for a falling tide as for a rising tide. For example, the inlet 401 is described as being opened at tide level 4 for both the rising tide and the falling tide. This is for simplicity in the explanation of the operation. In practice, the inlet may be opened at one tide level on a rising tide and opened again at another tide level on a falling tide. In other words, tide level 4 on a rising tide does not necessarily equal tide level 4 on a falling tide. The same is true for the other tide levels on the rising and falling tides.

Also, the number of cycles of the vessel rising and falling on a rising tide may differ from the number of cycles on a falling tide. The number of cycles depends on the duration of the changing tide between slack tides (between high and low tides), the duration of moving water into and out of the harborage and the water level in the discharge pond. Initially, at tide level 1, only one inlet may be used to flow water into the harborage and one outlet to the drainage pond. As the volume of water increases, more inlets and outlets may be used to move more water in and out of the harborage.

In the harborage, plural vessels can be provided and can be made to rise and fall independently of each other. This is particularly useful for generating power at slack tide, as discussed above. For example, on a rising tide, some vessels can be allowed to rise to generate power, while other vessels are held in a down position by valves in the hydraulic lines 43 (see FIG. 22) or orifices to slow down the vertical movement of the vessel. At high tide, these vessels are allowed to rise to generate power. As still another example, on a falling tide, some vessels can be allowed to fall to generate power, while other vessels are held up by valves in the hydraulic lines 43 or orifices therein. At lower or low tide, these vessels are allowed to fall to generate power. Thus, power can be produced continuously.

The discharge pond 409 can be used as a reservoir for high water. For example, at high tide, the outlet 413 can be opened to fill the discharge pond with water at the level of the high tide. As the tide in the water body 407 falls, the harborage is filled with water from the discharge pond by way of outlet 403 and drains into the water body by way of inlet 401. The vessel thus will fall to the level of the tide in the water body 407, while rising to the level of the high tide. As an alternative, a reservoir pond separate from the discharge pond can be used to provide the high tide water. The reservoir pond is recharged with high tide water at each high tide by way of a valved inlet.

The harborage 13 can be configured to rapidly fill with water and rapidly drain water. By allowing the water to rapidly rise and fall, more energy can be produced over a period of time, as more rise and fall cycles can be made to occur over the course of a day.

Figure 26:
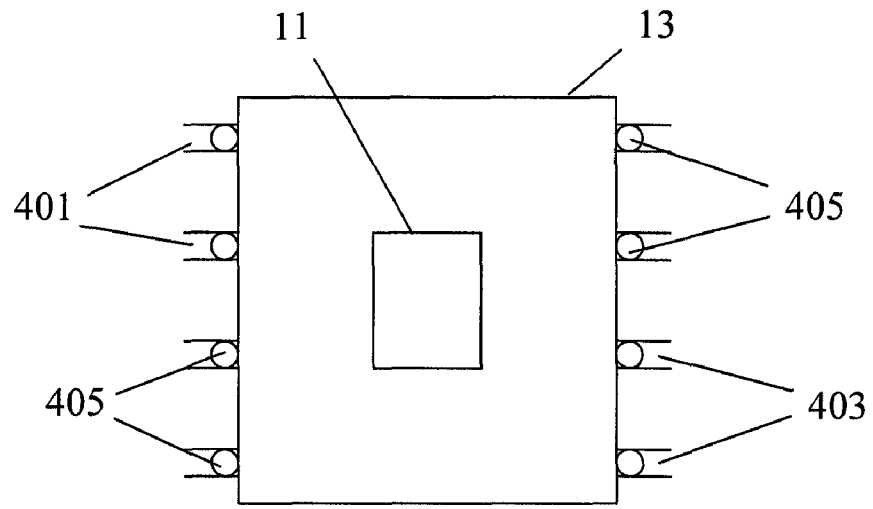
FIG. 26 is a top plan view of a harborage, in accordance with another embodiment, subject to fluctuating water levels.

FIG. 26 shows a harborage 13 similar to that shown in FIG. 23. The harborage 13 in FIG. 26 has a number of inlet and outlet ports 401, 403. The inlet ports 401, when fully open, present a relatively large surface area so that large volumes of water can pass through in a short period of time. Each inlet port 401 has a valve 405. To allow the most volume of water through the inlet, all of the inlet valves 405 are opened. To regulate the volume of water flow, some of the valves are opened, while the remaining inlet valves are closed. Likewise, the outlet ports 403 are provided with valves 405 that can be operated independently of each other.

Figure 27:
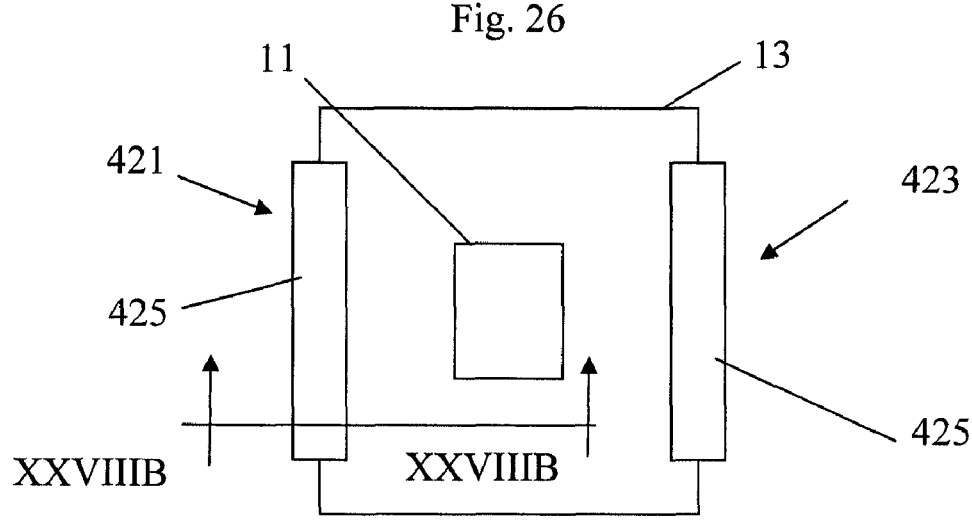
FIG. 27 is a top plan view of a harborage, in accordance with another embodiment, subject to fluctuating water levels.
Figures 28A, 28B:
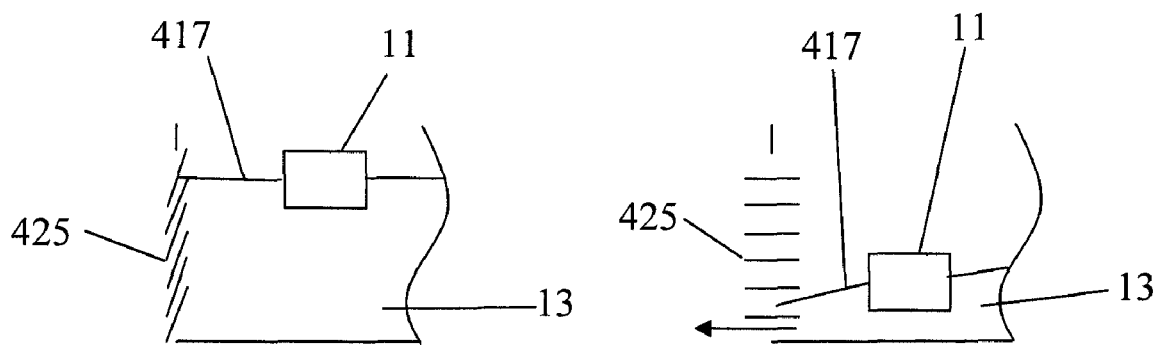
FIGS. 28A and 28B are side cross-sectional views of the harborage of FIG. 27.

FIG. 27 shows a harborage in accordance with another embodiment. The inlet and outlet ports 421, 423 are large in cross-sectional area and are opened and closed by way of vane type valves 425. As shown in FIGS. 28A and 28B, the vanes move between open and closed positions. FIG. 28A shown the vanes 425 in the closed position, while FIG. 28B shows the vanes in the fully open position. The vanes can be partially open to regulate the flow of water therethrough. When the vanes change from fully closed to fully open, large volumes of water can flow therethrough.

Thus, with the harborages shown in FIGS. 26 and 27, water can flow rapidly in and out to quickly change the water level inside the harborage.

Figure 29:
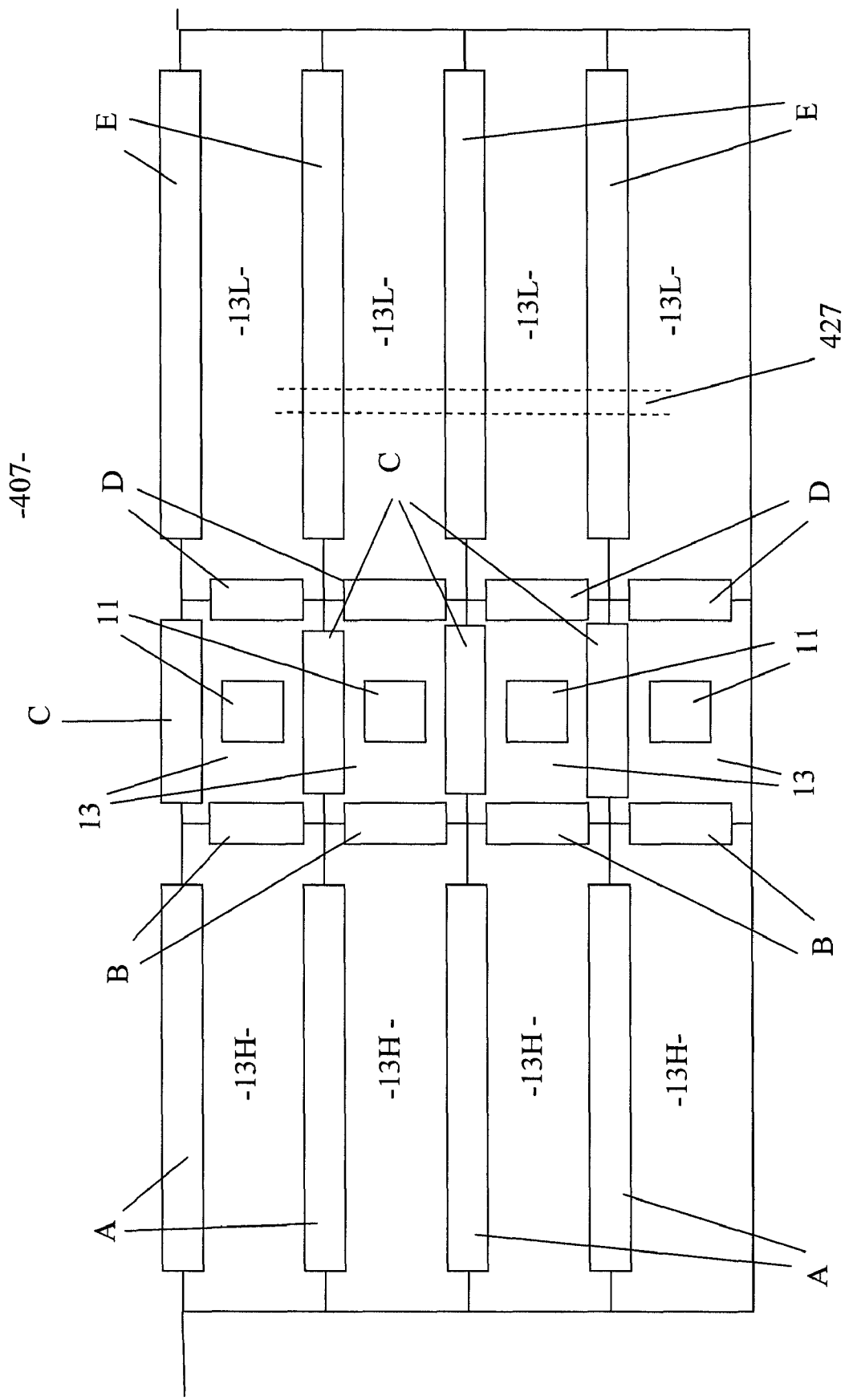
FIG. 29 is a top plan view of an arrangement of the harborages, subject to fluctuating water levels.

FIG. 29 shows an arrangement of harborages 13, reservoirs 13H and drainage areas 13L. The reservoirs 13H can be considered harborages, while the drainage areas 13L can also be considered harborages. For purposes of the example shown in FIG. 29, the harborages 13 are equipped with vessel hulls 11. The other harborages 13H and 13L could also be equipped for vessel hulls. Each harborage has adjacent harborages and communicates with these adjacent harborages by way of valved ports. In the example shown in FIG. 29, the valves are vanes 425; however, the valves can be other types of vanes as well. The harborages can communicate with nonadjacent harborages by way of appropriate conduits such as piping 427. The harborages communicate with a water body 407 by way of valved ports.

Figure 30:
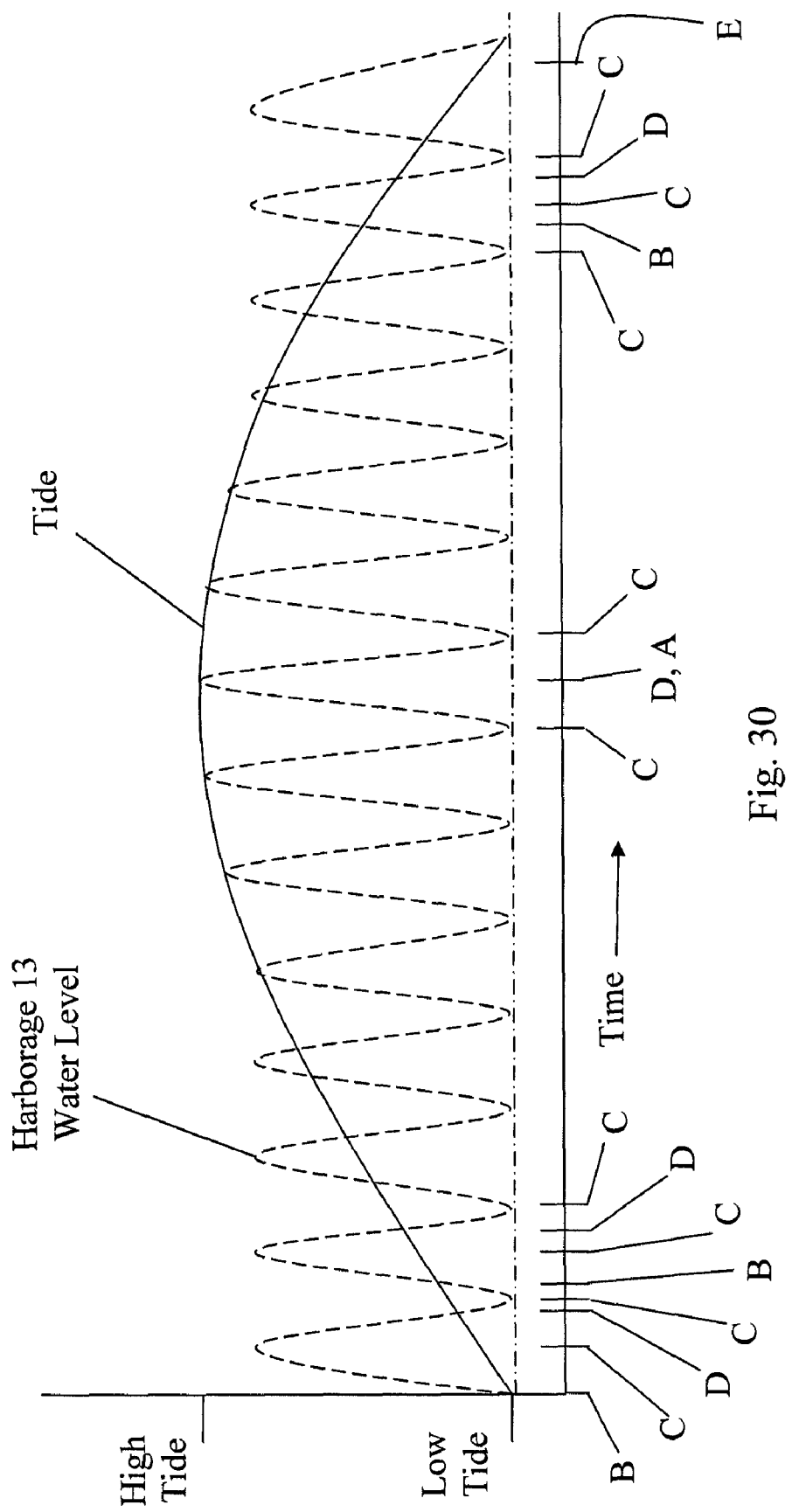
FIG. 30 is a graph showing the water level inside of the vessel harborage of FIG. 29 during a rising and falling tide.

The arrangement of FIG. 29 allows plural cycles of rising and falling during a single tidal cycle. FIG. 30 illustrates this concept. One or more harborages 13 have vessel hulls 11 therein. The harborages 13L serve as drainage areas while the harborages 13H serve as water reservoirs. The water reservoirs 13H and drainage areas 13L are many times larger in area and volume than the harborages 13. The water reservoirs 13H are filled by opening gates or valves A at high tide of the water body 407. Once the reservoirs 13H are filled, these valves A are closed. The drainage areas 13L are emptied into the water body 407 at low tide by opening gates or valves E. Once emptied, these valves E are closed.

FIG. 30 begins at low tide. At that time, the reservoirs 13H are full and the drainage areas 13L are emptied. In this example, the harborages 13 are also emptied.

Valves B are opened to fill the harborages 13 with water from the reservoirs 13H. The vessels 11 inside of the harborages 13 rise. Each time the vessels rise or fall, power is produced by way of the linear-to-rotary converters. When the vessel harborages 13 are full, valves B are closed. In order to conserve volume in the drainage area 13L, the water in the vessel harborages 13 is first drained to the water body as that water level is still relatively low. Valves C are opened to drain most of the water from the vessel harborages 13 into the water body 407. Once the water levels in the vessel harborages 13 equalize with the water body level, valves C are closed. Valves D are then opened to drain water from the vessel harborages 13 into the drainage areas 13L. The vessels 11 fall during this falling water level.

This cycle can be repeated to raise and lower the vessel 11 while the tide is rising in the water body 407. However, the water body is no longer at low tide; because the tide is rising, it has a water level that is relatively high; valves C are opened until the water levels between the water body and the vessel harborages 13 equalize. This conserves water volume and head in the reservoirs 13H. Once the water level is equalized, valves C are closed and valves D are opened. The water levels in the vessel harborages 13 rise, as do the vessels. Once the water levels equalize between the reservoirs 13H and harborages 13, valves D are closed.

Then, valves C are opened to drain some of the water from the harborages 13 into the water body 407. Once the water level equalizes, valves C are closed and valves D are opened to drain water into the drainage areas 13L. The vessels fall with the falling water levels inside of the harborages. Once drained, valves D are closed and valves C are opened.

If the reservoirs 13H and the drainage areas 13L are large enough, then valves C need not be utilized. Instead, the reservoirs can be used to completely fill the harborages 13, while the drainage areas can be used to drain the harborage 13.

As the water body tide approaches its peak, the harborages 13 can communicate directly with the water body 407 by opening valves C to fill the harborages 13. To drain the harborages 13, valves C are closed and valves D are opened. Valves A are also opened at high tide to recharge the reservoirs 13H and raise the water levels therein.

On a falling tide, the harborages 13 are filled first by opening valves C and then once the water levels have equalized between the harborages 13 and the water body 407, closing valves C and opening valves B. To drain the harborages 13, valves C are opened until water levels equalize and then valves C are closed and valves D are opened. At low tide, valves E are opened to drain the drainage areas 13L.

The example above has just focused on opening the reservoirs 13H together in unison. However, the reservoirs 13H can be operated independently of each other, with one or more serving as "peaking" reservoirs to provide a higher water level. For example, when filling the harborages 13, first the water body 407 is used to the extent that there is any higher water level in the water body relative to the harborages. Then, a first reservoir can be used to fill the harborages 13 to a next higher water level, followed by a second reservoir. The first reservoir provides more water volume to the harborages than does the second reservoir, so the water level in the first reservoir drops more than the water level in the second reservoir. One or more reservoirs can be used to provide low volumes of water, yet at high water levels. Such reservoirs "peak" the water level in the harborages. The same can hold true of the drainage areas.

Although the water body 407 has been discussed as being subject to tidal activity, it could be areas that flood such as along rivers or lakes.

Tide levels may vary over time. For example, in spring tides, the low tides are lower than average, while the high tides are higher than average. Conversely, for neap tides, the low tides are higher than average, while the high tides are lower than average. Because of this variation in tide level, the drainage areas may be located at a particular low tide level.

The drainage areas can be made at or above low tide level. However, for a drainage area above low tide level, a water lift is needed to lift the water out of the lower elevation to the drainage area. For example, low tide level water is lifted to the drainage area. A water lift can also be used to lift water out of the harborage into the water body. Thus, the water body serves as the drainage area.

Figure 31:
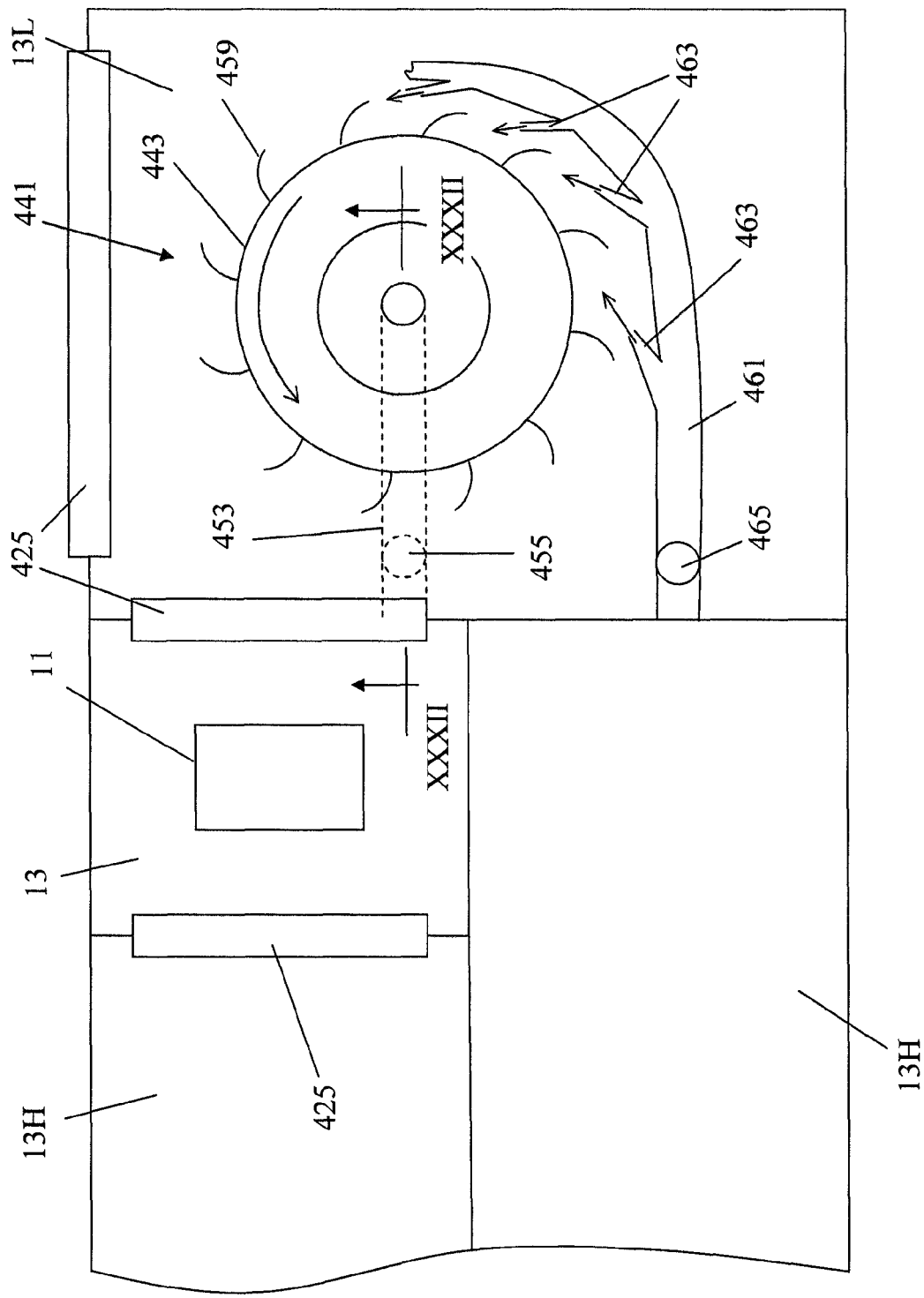
FIG. 31 is a top plan view of a harborage, in accordance with another embodiment.
Figure 32:
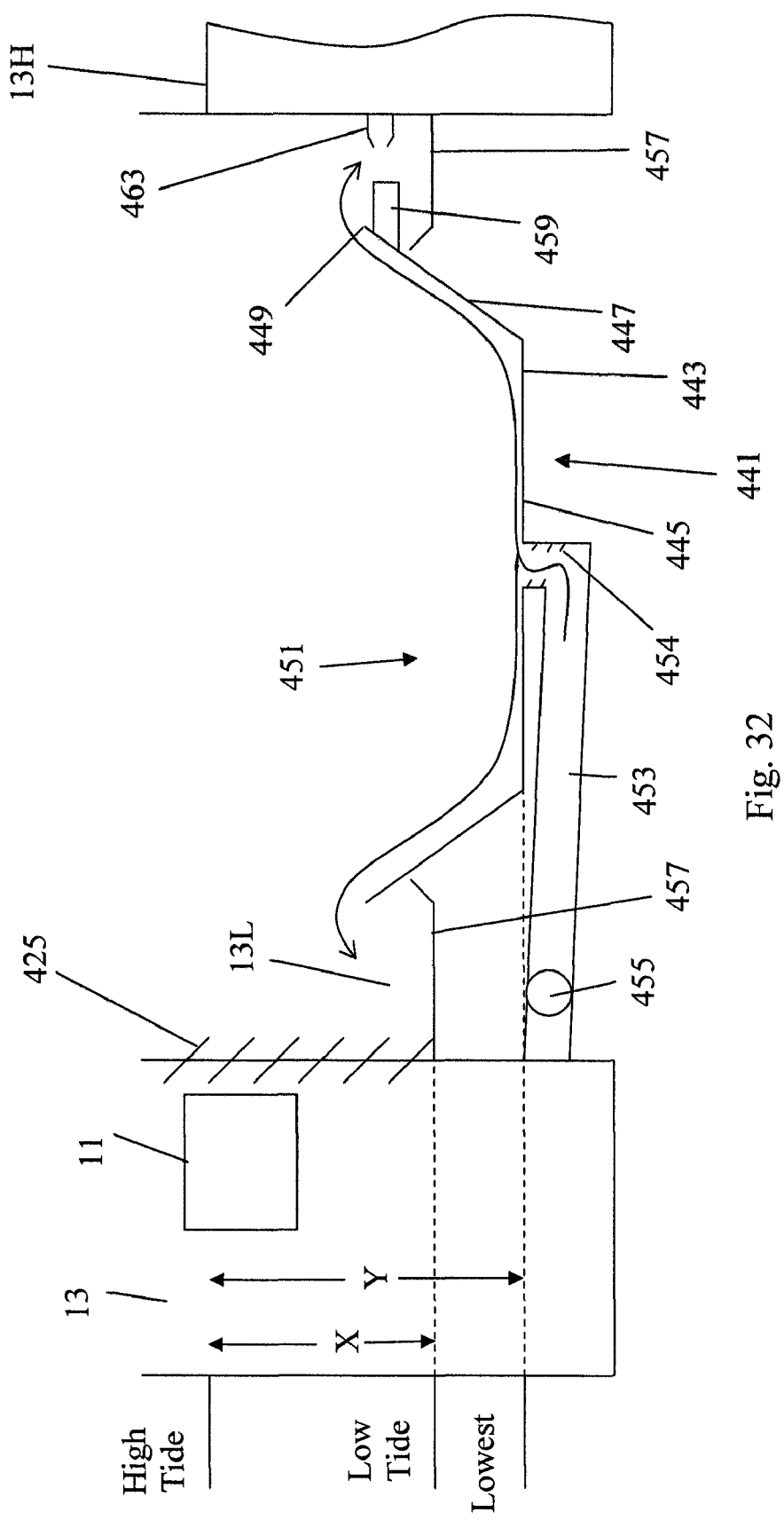
FIG. 32 is a side cross-sectional view of the harborage of FIG. 31, taken through lines XXXII-XXXII.

Various lifts can be used, such as a pump. However, the water lift preferably uses less power to lift water out of the harborage than is provide from the harborage. One such water lift 441 is shown in FIGS. 31 and 32. The lift 441 uses a rotating dish, pan or bowl 443 to impart centrifugal force to the water and drive the water up and out of the bowl. The bowl 443 is located in a drainage area 13L. The bowl 443 is generally circular in plan view and has a bottom 445 and a side wall 447. The side wall 447 is angled to the outside and extends up and radially out from the bottom wall 445. In other words, the outside diameter of the side wall 441 is less at the bottom wall than at the upper rim 449. The bowl could have a curved bottom and side wall. The bowl 443 forms an interior 451 for receiving water.

A drain conduit 453 extends from the harborage 13 to the bottom 445 of the pan. In the preferred embodiment, the drain conduit 451 is sloped down from the harborage to the bowl and enters the bowl from underneath. The drain conduit has a valve 455.

The drainage area 13L has a floor 457 or bottom that is above the bowl bottom 445. The drainage area floor 457 extends underneath the upper rim 449 of the bowl. This portion of the drainage area floor that is underneath the bowl 443 is inclined up in order to direct water on the drainage area floor away from the bowl.

The bowl 443 rotates relative to the drainage area floor 457 and the conduit 453. The bowl 443 can be rotated in a number of ways. For example, a motor can be used, whether the motor is driven by electricity or is of the internal combustion type. Alternatively, wind power can be used, wherein wind foils are mounted to the bowl.

FIGS. 31 and 32 show another way to rotate the bowl, namely by water pressure. The outside of the bowl 443 has vanes 459 or push surfaces, which vanes are above the drainage area floor 457, as well as any water level that may be on the drainage area floor. A supply reservoir 13H with a sufficient head of water provides water to rotate the bowl. A conduit 461 and nozzles 463 are provided to direct jets of water into the vanes. There can be a number of nozzles 463 which extend partially or fully around the bowl perimeter. The pressure from the water jets is provided by the head of water and the supply reservoir 13H. The supply reservoir for the lift can be different from or the same as the supply reservoir for the harborage. A valve 465 is provided in the conduit 461.

In operation, the harborage is filled as described above, using water from a supply reservoir 13H. Then, the harborage is drained into the drainage area 13L. Filling and draining the harborage raises and lowers the vessel hull 11, which uses linear-to-rotary converters. To drain the harborage 13, the harborage is first drained directly into the drainage area 13L, using the vaned outlets 425. The vanes 425 are opened and water in the harborage drains into the drainage area. While the water is draining from the harborage, the nozzle conduit valve 465 is opened. Water hits the bowl vanes 459 and causes the bowl to rotate. When the water in the harborage is at the level of the water in the drainage area 13L, water stops flowing through the vanes 425. The vanes 425 are closed and the lift 441 can be used. The drainage conduit valve 455 is opened. Water in the harborage 13 drains into the conduit 453 and enters the interior 451 of the bowl. The last portion of the conduit 453 can be provided with a corkscrew arrangement 454 of vanes to impart some rotation to the flow of water as it enters the bowl interior 451. The rotation in the bowl imparts centrifugal force to the water therein and causes the water to move radially out. It is believed that friction between the bowl surface and the water imparts centrifugal force to the water. To increase the centrifugal force imparted to the water, the interior surface of the bowl can be roughened. Ridges can also be used, which ridges protrude up from the bowl. The water moves up the side wall 447, until the water exits the bowl over the rim 449. The water then falls into the drainage area 13L. The bowl 443 keeps rotating, lifting the water out of the harborage to a higher elevation in the drainage area. When the harborage is effectively emptied (the harborage need only be emptied to the extent that the vessel hull is at its bottom position), the valve 455 is closed. The harborage can be refilled again with water. The drainage area 13L can be emptied at the next low tide.

The advantage of using the lift 441 is that water in the harborage can be drained below the level of low tide. The harborage can be dug deeper than low tide level to lower the lowest water level. The inlet to the drainage conduit 453 is located below this lowest water level. As shown in FIG. 32, the vertical distance between high and low tides is shown as X. The vertical distance between high tide and the lowest water level in the harborage is shown as Y. The distance Y is greater than the distance X. Thus, the amount of head and vertical movement in the harborage can be increased beyond the tidal variance available at the water body. This is particularly useful in areas of relatively low tidal variance. For example, suppose that tidal variance is 4 feet between high and low tides. With this arrangement, the variance in the harborage can be more, say 12 feet. Water would be lifted 8 feet or more from the lowest level of the harborage to the drainage area floor, which need only be at low tide level.

Still another advantage is the elimination of large drainage areas. The lift can be such that it lifts water to high tide level. Thus, the water can be lifted and returned directly to the water body. In such an arrangement, the vaned outlet 425 between the harborage 13 and the drainage area 13L is opened only when the water level in the drainage area (the water body) is below the level of water in the harborage. The vaned outlet 425 need not be used at all, with the water lift 441 lifting all of the water out of the harborage. However this arrangement uses more power to rotate the bowl as more water must be lifted.

The foregoing disclosure and showings made in the drawings are merely illustrative of the principles of this invention and are not to be interpreted in a limiting sense.

The invention claimed is:
1. A power generator, comprising:
 a) a harborage with a vessel hull therein;
 b) a supply reservoir larger than the harborage, the supply reservoir having a valved inlet subject to fluctuating water levels of a water body, the reservoir communicating with the harborage through a reservoir valve;
 c) a drainage area larger than the harborage, the drainage area having a valved outlet subject to fluctuating water levels of the water body, the drainage area communicating with the harborage through a drainage valve;

d) the vessel hull capable of rising and falling in the harborage as a level of water in the harborage changes independently of the water level of the water body due to the reservoir supplying water to the harborage through the reservoir valve and the drainage area draining water from the harborage by way of the drainage valve;

e) a linear-to-rotary converter, at least one part of which is coupled between the hull and a fixed object, the converter converting the vertical movement of the hull into rotational movement.

2. The power generator of claim 1 wherein the water body is subject to tidal activity.

3. The power generator of claim 1 wherein the water body is subject to flooding.

4. The power generator of claim 1 wherein the harborage communicates with the water body through a harborage valve.

5. The power generator of claim 1 wherein the valved inlet allows the water level in the harborage to rise rapidly.

6. The power generator of claim 5 wherein the valved inlet comprises multiple vanes.

7. The power generator of claim 1 wherein the valved outlet allows the water level in the harborage to fall rapidly.

8. The power generator of claim 7 wherein the valved outlet comprises multiple vanes.

9. The power generator of claim 1 wherein:
a) the valved inlet allows the water level in the harborage to rise rapidly;
b) the valved outlet allows the water level in the harborage to fall rapidly;
c) each of the valved inlet and the valved outlet comprise multiple vanes.

10. The power generator of claim 1 wherein the supply reservoir is a first supply reservoir, further comprising a second supply reservoir, the second supply reservoir communicating with the harborage through a second reservoir valve, the second supply reservoir serving as a peaking reservoir.

11. The power generator of claim 1 wherein the drainage area is a first drainage area, further comprising a second drainage area, the second drainage area communicating with the harborage through a second drainage valve, the second drainage area serving as a peaking drainage area.

12. The power generator of claim 1 further comprising a water lift for lifting water from a first elevation in the harborage to a higher second elevation outside of the harborage.

13. The power generator of claim 12 wherein the first elevation is located below low tide of the water body.

14. The power generator of claim 1 wherein the water lift comprises a bottom with an inclined side wall that extends radially out from the bottom, the water lift forming an interior, the water lift rotates, the valved outlet communicates with the interior.

15. An apparatus for raising and lowering a vessel hull, comprising:
a) a harborage, with the vessel hull located therein, the vessel hull capable of moving up and down in the harborage;
b) a water supply communicating with the harborage through a supply valve, the water supply providing water to the harborage to a high level;
c) a water lift comprising a bottom with an inclined side wall that extends up and radially out from the bottom, the water lift forming an interior, the water lift rotating;
d) a drainage area;
e) a drain outlet allowing communication between the harborage and the water lift interior, wherein water in the interior of the rotating lift moves up the side wall to a higher elevation than the bottom and exits the lift into the drainage area.

16. The apparatus of claim 15 wherein the water supply and the drainage area are subject to tidal activity.

17. The apparatus of claim 16 wherein the tidal activity comprises a high tide level and a low tide level, the water lift lifting water in the harborage that is below the low tide level to a level that is at least as high as the low tide level.

18. The apparatus of claim 15 further comprising water jets directed at push surfaces in the water lift for rotating the water lift, the water in the water jets draining into the drainage area.

19. The apparatus of claim 15 further comprising a linear-to-rotary converter, at least one part of which is coupled between the hull and a fixed object, the converter converting the vertical movement of the hull into rotational movement.

* * * * *